United States Patent
Azad

(10) Patent No.: US 10,923,863 B2
(45) Date of Patent: Feb. 16, 2021

(54) HIGH VOLTAGE CONNECTOR AND METHOD FOR ASSEMBLING THEREOF

(71) Applicant: J.S.T. CORPORATION, Farmington Hills, MI (US)

(72) Inventor: Vikas Azad, Novi, MI (US)

(73) Assignee: J.S.T. CORPORATION, Farmington Hills, MI (US)

( * ) Notice: Subject to any disclaimer, the term of this patent is extended or adjusted under 35 U.S.C. 154(b) by 0 days.

(21) Appl. No.: 16/370,069

(22) Filed: Mar. 29, 2019

(65) Prior Publication Data

US 2020/0176924 A1    Jun. 4, 2020

Related U.S. Application Data

(60) Provisional application No. 62/775,103, filed on Dec. 4, 2018, provisional application No. 62/802,829, filed on Feb. 8, 2019.

(51) Int. Cl.
*H01R 13/6599* (2011.01)
*B60R 16/03* (2006.01)
(Continued)

(52) U.S. Cl.
CPC ......... *H01R 13/6599* (2013.01); *B60R 16/03* (2013.01); *H01R 13/426* (2013.01);
(Continued)

(58) Field of Classification Search
CPC .......................... H01R 13/426; H01R 13/4367; H01R 13/502; H01R 13/5202; H01R 13/53;
(Continued)

(56) References Cited

U.S. PATENT DOCUMENTS 4,236,779 A    12/1980 Tang
4,433,206 A    2/1984 Lewis
(Continued)

OTHER PUBLICATIONS

Demaratos, David; U.S. Appl. No. 16/383,624, filed Apr. 14, 2019.
(Continued)

*Primary Examiner* — Oscar C Jimenez
(74) *Attorney, Agent, or Firm* — Kratz Quintos & Hanson, LLP

(57) ABSTRACT

A high voltage connector, connected to a device, that experiences a reduced electromagnetic interference (EMI), avoids galvanic corrosion of dissimilar metals within or without a fluid environment, and provides an effective electrical ground system. The connector includes an outer housing assembly, an inner housing mounted inside the outer housing, a set of cable reinforcement retainer assemblies secured inside the inner housing, a back cover through which the cables respectively slide along and covers a central opening of the outer housing, a braided shield covering the cables, and a clamp that connects the shield onto the outer housing. When assembling the high voltage connector, the outer housing is mounted onto the device; the inner housing is secured inside the outer housing; the set of cable reinforcement retainer assemblies with associated cables is secured in and extends in a substantially vertical direction from the inner housing; a back cover is slid along the cables, and enters and covers a central opening of the outer housing; and a braided shield is mounted and connected to the outer housing by a clamp.

20 Claims, 18 Drawing Sheets

(51) Int. Cl.

| | | |
|---|---|---|
| *H01R 13/502* | (2006.01) | |
| *H01R 13/6581* | (2011.01) | |
| *H01R 13/6596* | (2011.01) | |
| *H01R 13/74* | (2006.01) | |
| *H01R 13/426* | (2006.01) | |
| *H01R 13/436* | (2006.01) | |
| *H01R 13/52* | (2006.01) | |
| *H01R 13/53* | (2006.01) | |
| *H01R 13/73* | (2006.01) | |
| *H01R 43/20* | (2006.01) | |
| *H01R 13/533* | (2006.01) | |
| *H01R 13/6598* | (2011.01) | |

(52) U.S. Cl.
CPC ....... *H01R 13/4367* (2013.01); *H01R 13/502* (2013.01); *H01R 13/5202* (2013.01); *H01R 13/53* (2013.01); *H01R 13/533* (2013.01); *H01R 13/6581* (2013.01); *H01R 13/6596* (2013.01); *H01R 13/73* (2013.01); *H01R 13/748* (2013.01); *H01R 43/20* (2013.01); *H01R 13/6598* (2013.01); *H01R 2201/26* (2013.01)

(58) Field of Classification Search
CPC .. H01R 13/658; H01R 13/6581; H01R 13/73; H01R 43/20
See application file for complete search history.

(56) References Cited

U.S. PATENT DOCUMENTS

| | | | |
|---|---|---|---|
| 4,531,805 A | 7/1985 | Werth | |
| 4,684,192 A | 8/1987 | Long | |
| 4,886,463 A | 12/1989 | Scott | |
| 4,975,085 A | 12/1990 | Cartesse | |
| 5,326,947 A | 7/1994 | Edds | |
| 5,531,614 A * | 7/1996 | Gallusser | H01R 13/6633 439/607.01 |
| 6,083,014 A | 7/2000 | Bogdan | |
| 6,554,623 B2 | 4/2003 | Yoshioka | |
| 6,595,801 B1 | 7/2003 | Leonard | |
| 6,815,610 B2 | 11/2004 | Kuboshima | |
| 6,921,292 B2 * | 7/2005 | Miyazaki | H01R 9/032 439/564 |
| 7,104,822 B2 | 9/2006 | Jazowski | |
| 7,165,995 B2 | 1/2007 | Fukushima | |
| 7,182,612 B1 | 2/2007 | Immethun | |
| 7,613,003 B2 | 11/2009 | Pavlovic | |
| 7,614,910 B2 * | 11/2009 | Croteau | H01R 13/512 439/559 |
| 7,632,148 B1 | 12/2009 | Kawamura | |
| 7,811,105 B1 | 10/2010 | Tan Chin Yaw | |
| 8,262,413 B2 | 9/2012 | Fujiwara | |
| 8,747,157 B2 | 6/2014 | Tashiro | |
| 8,840,350 B2 | 9/2014 | Inaba | |
| 8,986,045 B2 * | 3/2015 | Okamoto | H01R 13/6593 439/607.41 |
| 8,992,249 B2 * | 3/2015 | Kobayashi | H01R 13/6591 439/362 |
| 9,040,846 B2 | 5/2015 | Suzuki | |
| 9,252,509 B2 | 2/2016 | Kato | |
| 9,337,577 B1 | 5/2016 | Hitchcock | |
| 9,431,727 B2 | 8/2016 | Kato | |
| 9,431,771 B1 | 8/2016 | Sundarakrishnamachari et al. | |
| 9,496,656 B2 | 11/2016 | Hsu | |
| 9,640,965 B1 | 5/2017 | Long | |
| 9,716,374 B2 | 7/2017 | Rohr | |
| 9,746,021 B2 | 8/2017 | Kawashima | |
| 9,948,038 B2 | 4/2018 | Katou | |
| 2002/0031949 A1 | 3/2002 | Miyazaki | |
| 2002/0042228 A1 | 4/2002 | Yoshioka | |
| 2002/0048994 A1 * | 4/2002 | Oota | H01R 9/24 439/98 |
| 2002/0098737 A1 | 7/2002 | Koide | |
| 2003/0008555 A1 | 1/2003 | Obata | |
| 2004/0057187 A1 * | 3/2004 | Kuboshima | H01R 9/032 361/118 |
| 2004/0106325 A1 * | 6/2004 | Miyazaki | H01R 9/032 439/564 |
| 2004/0235351 A1 | 11/2004 | Aisenbrey | |
| 2005/0215122 A1 * | 9/2005 | Nishida | H01R 9/032 439/607.41 |
| 2007/0149008 A1 | 6/2007 | Pabst | |
| 2007/0270037 A1 * | 11/2007 | Deterre | H01R 4/72 439/607.41 |
| 2009/0124121 A1 | 5/2009 | Matsuoka | |
| 2009/0149048 A1 | 6/2009 | Pavlovic | |
| 2009/0181571 A1 * | 7/2009 | Willing | H01R 13/5202 439/359 |
| 2010/0261364 A1 * | 10/2010 | Matsuoka | H01R 13/5202 439/271 |
| 2010/0279555 A1 | 11/2010 | Azad | |
| 2012/0021632 A1 * | 1/2012 | Matsumoto | H01R 13/506 439/271 |
| 2012/0155988 A1 * | 6/2012 | Schumacher | F16B 31/02 411/369 |
| 2012/0252272 A1 | 10/2012 | Omae | |
| 2013/0017719 A1 * | 1/2013 | Tanaka | H01R 9/032 439/587 |
| 2013/0078872 A1 * | 3/2013 | Tashiro | H01R 13/4364 439/695 |
| 2014/0011401 A1 * | 1/2014 | Endo | H01R 13/5205 439/588 |
| 2014/0038459 A1 * | 2/2014 | Kobayashi | H01R 9/032 439/607.41 |
| 2014/0127063 A1 | 5/2014 | Itsuki | |
| 2014/0287631 A1 * | 9/2014 | Tashiro | H01R 13/521 439/733.1 |
| 2014/0370753 A1 * | 12/2014 | Kobayashi | H01R 13/5205 439/607.41 |
| 2015/0050826 A1 * | 2/2015 | Tashiro | H01R 13/506 439/278 |
| 2015/0079859 A1 * | 3/2015 | Glick | H01R 43/20 439/891 |
| 2015/0087190 A1 * | 3/2015 | Schwan | H01R 13/4362 439/695 |
| 2015/0219140 A1 | 8/2015 | Jenning | |
| 2015/0270650 A1 | 9/2015 | Bower | |
| 2015/0280381 A1 * | 10/2015 | Rangi | H01R 13/18 439/607.01 |
| 2016/0134049 A1 * | 5/2016 | Kataoka | H01R 13/5205 439/587 |
| 2016/0172784 A1 * | 6/2016 | Kataoka | H01R 13/5219 439/271 |
| 2016/0181736 A1 | 6/2016 | Hsu | |
| 2016/0233625 A1 * | 8/2016 | Kato | H01R 13/688 |
| 2016/0329651 A1 * | 11/2016 | Yamaguchi | H01R 11/12 |
| 2016/0329661 A1 | 11/2016 | Fischer | |
| 2017/0303446 A1 | 10/2017 | Johansson | |
| 2017/0338600 A1 * | 11/2017 | Tanaka | H01R 24/28 |
| 2018/0034200 A1 | 2/2018 | Rhein | |

OTHER PUBLICATIONS

Written Opinion of the International Searching Authority for International Application No. PCT/US2019/062861 dated Jan. 14, 2020 (8 sheets).
International Search Report for International Application No. PCT/US2019/062861 dated Jan. 14, 2020 (3 sheets).
International Search Report for International Application No. PCT/US19/42437 dated Oct. 21, 2019 (3 sheets).
Written Opinion of the International Searching Authority for International Application No. PCT/US19/42437 dated Oct. 21, 2019 (6 sheets).
Demaratos, David; U.S. Appl. No. 16/447,731, filed Jun. 20, 2019.
Azad, Vikas; U.S. Appl. No. 16/504,288, filed Jul. 7, 2019.
Demaratos, David; U.S. Appl. No. 16/536,123, filed Aug. 8, 2019.
Azad, Vikas; U.S. Appl. No. 16/504,287, filed Jul. 7, 2019.

(56) References Cited

OTHER PUBLICATIONS

Demaratos, David; U.S. Appl. No. 16/583,915, filed Sep. 26, 2019.
Azad, Vikas; U.S. Appl. No. 16/369,943, filed Mar. 29, 2019.
Office Action of U.S. Appl. No. 16/369,943 dated Jan. 22, 2020.
Office Action of U.S. Appl. No. 16/536,123 dated Mar. 10, 2020.
Office Action of U.S. Appl. No. 16/447,731 dated Feb. 6, 2020.
International Search Report for International Application No. PCT/US19/63068 dated Feb. 11, 2020 (4 sheets).
Written Opinion of the International Searching Authority for International Application No. PCT/US19/63068 dated Feb. 11, 2020 (9 sheets).
International Search Report for International Application No. PCT/US19/45971 dated Feb. 6, 2020 (3 sheets).
Written Opinion of the International Searching Authority for International Application No. PCT/US19/45971 dated Feb. 6, 2020 (6 sheets).
International Search Report for International Application No. PCT/US19/042441 dated Oct. 7, 2019 (3 sheets).
Written Opinion of the International Searching Authority for International Application No. PCT/US19/042441 dated Oct. 7, 2019 (4 sheets).
Written Opinion of the International Searching Authority for International Application No. PCT/US2020/015929 dated Apr. 20, 2020 (6 sheets).
International Search Report for International Application No. PCT/US2020/015929 dated Apr. 20, 2020 (2 sheets).
International Preliminary Report on Patentability for International Application No. PCT/US2019/062861 dated Apr. 21, 2020 (12 sheets).

* cited by examiner

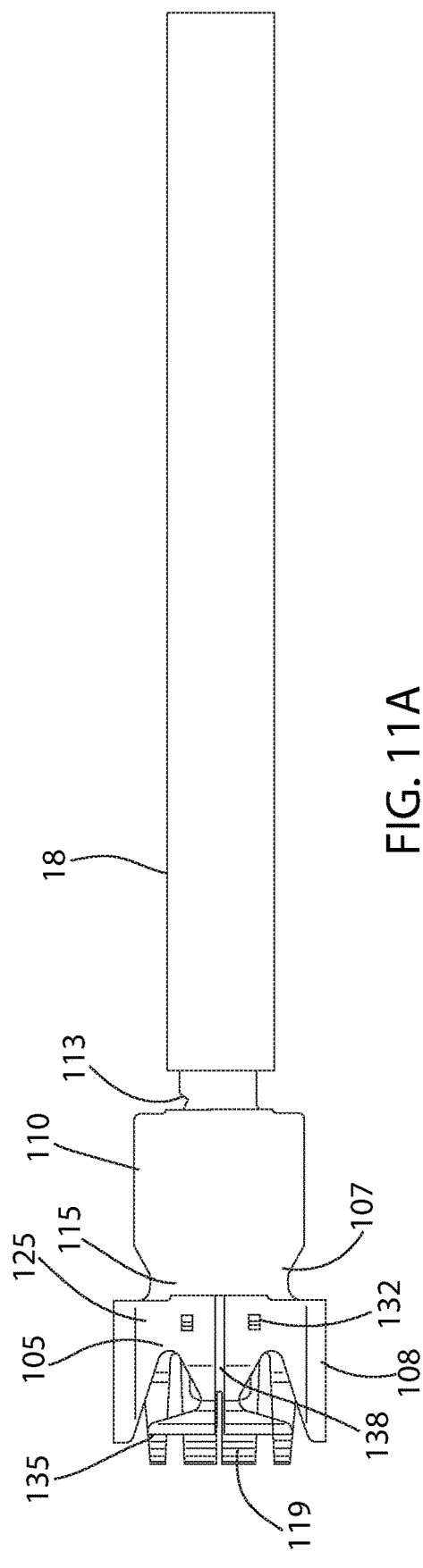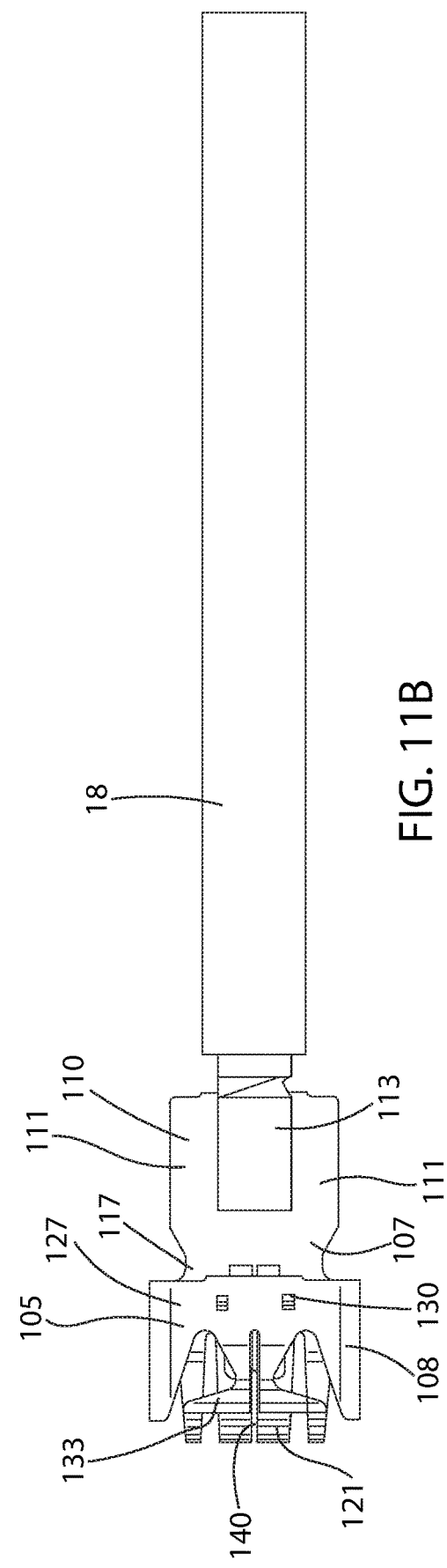

HIGH VOLTAGE CONNECTOR AND METHOD FOR ASSEMBLING THEREOF

CROSS-REFERENCE TO RELATED APPLICATIONS

This patent application claims priority to U.S. Provisional Patent Application No. 62/775,103 filed Dec. 4, 2018 and U.S. Provisional Patent Application No. 62/802,829 filed Feb. 8, 2019, which are hereby incorporated herein by reference in their entireties.

BACKGROUND OF THE INVENTION

It is desired that a high voltage connector connected to a device be provided. It is further desired that the high voltage connector experiences a reduced electromagnetic interference (EMI), avoids galvanic corrosion of dissimilar metals within or without a fluid environment, and provides an effective electrical ground system.

SUMMARY OF THE INVENTION

This invention provides such a high voltage connector for connecting to a device which, when in operation, experiences reduced EMI. This is achieved by providing the connector with a metallic braided shield on top of a transmission outer housing assembly. The connector in this invention is further provided with a metallic clamp that holds the metallic braided shield above the outer housing, and provides a conductive contact between the metallic braided shield and the outer housing. The outer housing, preferably made of a metal-infused plastic, includes an over-molded silicone seal to provide the necessary sealing and insulation layer to prevent galvanic corrosion between the connector and the device to which the connector is connected.

The metal-infused plastic outer housing with the over-molded silicone shield includes apertures through which bolts pass through for fastening the connector of the invention to the device. The bolts provide the necessary grounding among the metallic braided shield, metal-infused plastic outer housing, and the device to which the connector of this invention is to be connected. Each bolt is preferably inserted into a corresponding metallic compression limiter within a respective one of the apertures of the outer housing. A ground system is provided to the connector of this invention by establishing a contact between the connector and the device, with the connection of the connector to the device, by the bolts and the metallic compression limiters. Moreover, the steel bolts are contained within the metallic compression limiters, which are in turn contained within side apertures of the outer housing. On the outer periphery of the base of the metal-infused outer housing is an over-molded silicone seal, which, along with the above-described structural arrangement composed of dissimilar metals, provides for corrosive resistant characteristics.

The connector of this invention further includes an inner housing provided within the outer housing, the inner housing further having cable reinforcement retainer assemblies securely inserted therein.

The connector of this invention further includes a back cover, which acts as a terminal position assurance (TPA) device, through which cables slide and secured thereinto, during the assembly of the connector. The back cover includes over-molded silicone seals for isolating the connecting interface of the cables. During assembly of the connector, the back cover ensures that the inner housing is properly positioned within the outer housing.

Generally, upon assembly of the connector of this invention, a transmission outer housing assembly, having the metal-infused plastic outer housing with the over-molded silicone seal, is mounted onto the associated device with the bolts accommodated within the respective metallic compression limiters; the inner housing is seated inside and onto the base of the outer housing; the back cover with its associated cables and cable reinforcement retainer assemblies are mounted inside the outer housing and onto the inner housing with the cables being slid upwards through the back cover; the metallic braided shield is mounted onto the outer housing while covering the exposed cable; and the clamp is slid along the braided shield to secure thereof onto the outer housing.

BRIEF DESCRIPTION OF THE DRAWINGS

FIG. 3A is a top perspective view of the outer housing, while

FIG. 7A is a top perspective view of an inner housing showing a front portion and a top portion thereof, while

FIG. 11A is an elevational view of a first side portion of the end terminal and a first side portion of the clamp of the cable reinforcement retainer assembly, while FIG. 11B is an elevational view of a second side portion of the end terminal and a second side portion of the clamp of the cable retainer assembly.

FIG. 12A illustrates a perspective view of a front portion and a bottom portion of a back cover, while

FIG. 13A is a perspective view of a back portion and a top portion of the back cover; while

DETAILED DESCRIPTION OF THE PREFERRED EMBODIMENTS

Figure 1:
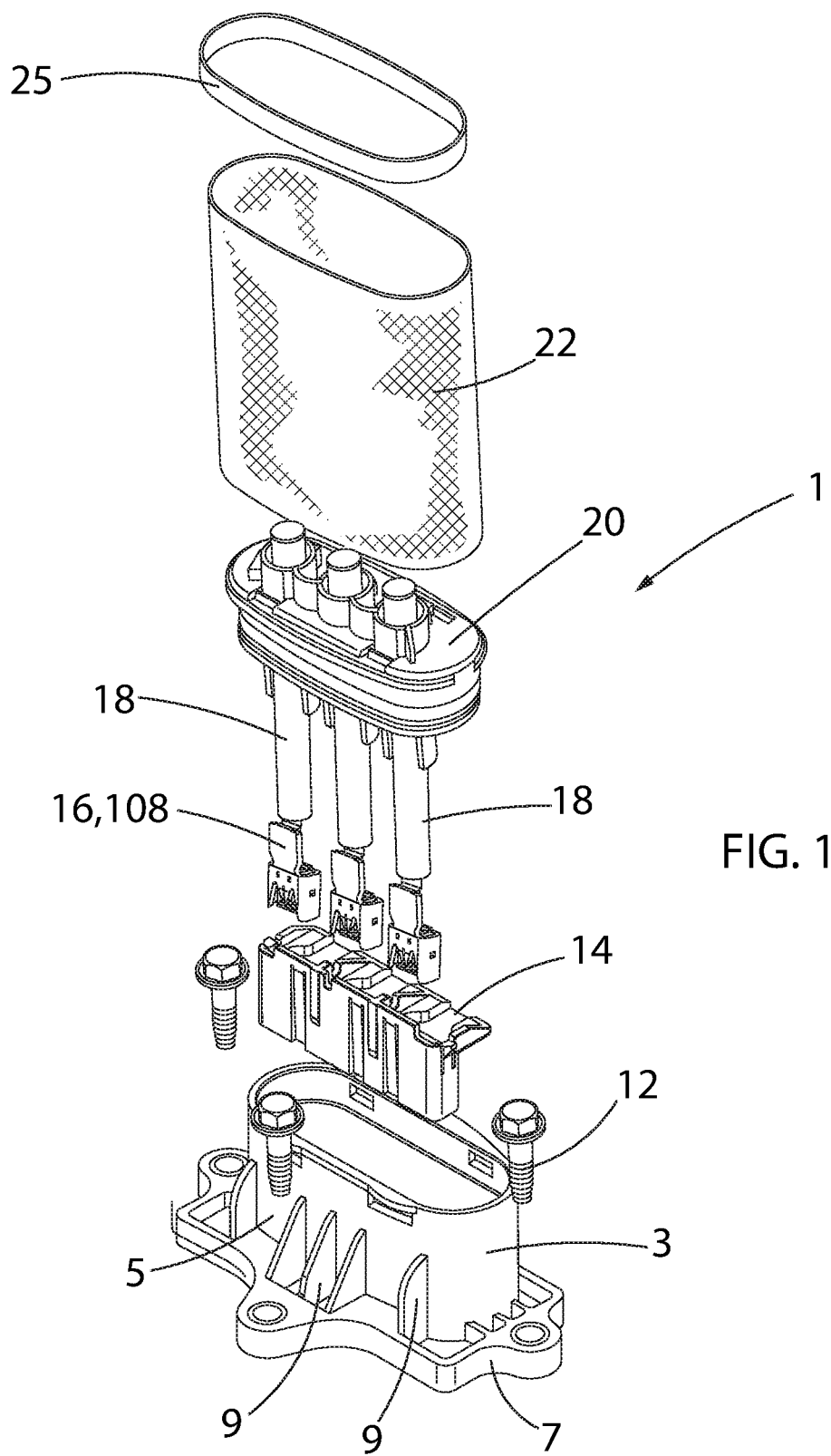
FIG. 1 is an exploded view of the high voltage connector of this invention, generally referred to by reference number 1, showing the different elements thereof arranged in the vertical direction ready to be mounted onto an associated device.

As illustrated in FIG. 1, the high voltage connector 1 includes an outer housing assembly 3, which includes an outer housing 5 with an accompanying over-molded silicone seal 7. The outer housing 5 is preferably made of a metal-infused housing, and includes side extending portions 62 of a base 32 thereof for accommodating therein respective bolts 12 (made of steel or the like) for fastening the connector 1 to an associated device 210 (see, FIG. 15; e.g., cast automotive transmission or the like made of, e.g., aluminum).

Accommodated within the outer housing 5 and mounted onto the base 32 thereof is an inner housing 14. The connector 1 further includes a set of cable reinforcement retainer assemblies 16 (specifically referred to as reference number 108 in FIGS. 9, 10, 11A, and 11B) for coupling with the inner housing 14 and a set of cables 18. The set of cables 18 is preferably high voltage cables (e.g., 25 mm$^2$ cables), although the type of cables is not limited thereto. Although shown in FIG. 1 is a set of 3-way high voltage cables, this embodiment is also not limited thereto. The cables 18 are slidably accommodated within a back cover 20. The connector 1 further includes a metallic (e.g., stainless steel) braided shield 22, which forms the outer layer of the connector 1, when the connector 1 is fully assembled, as shown in FIG. 2B. A metallic clamp 25 secures the braided shield 22 onto the outer housing 5, when the connector 1 is fully assembled, as also shown in FIG. 2B.

Figure 2A:
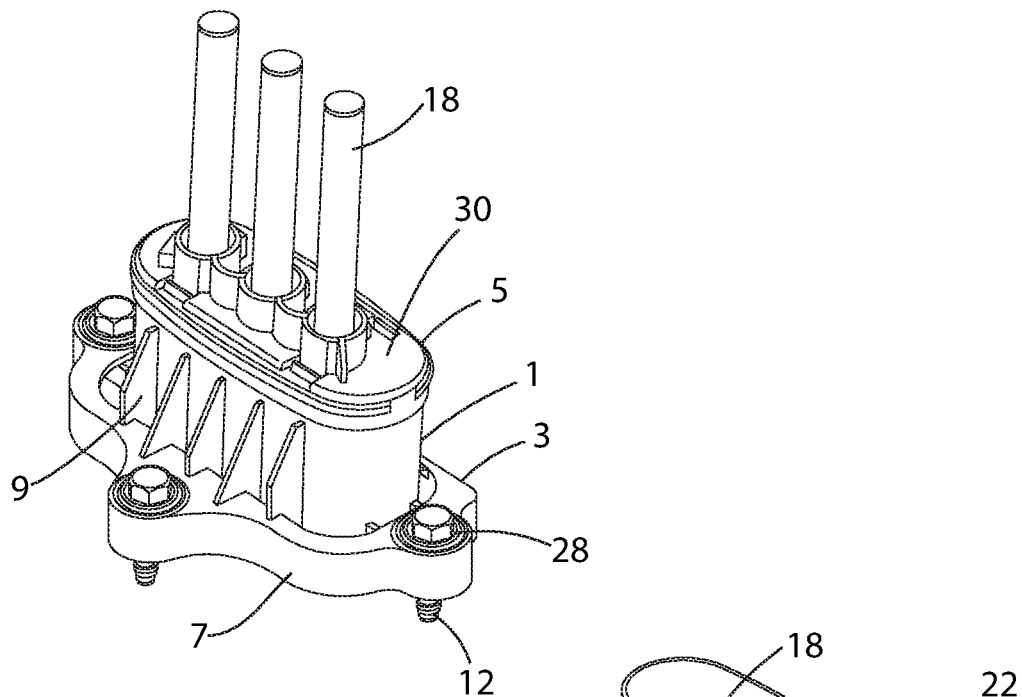
FIG. 2A is a perspective view of a fully assembled connector of this invention, absent the braided shield, with the cables exposed.
Figure 2B:
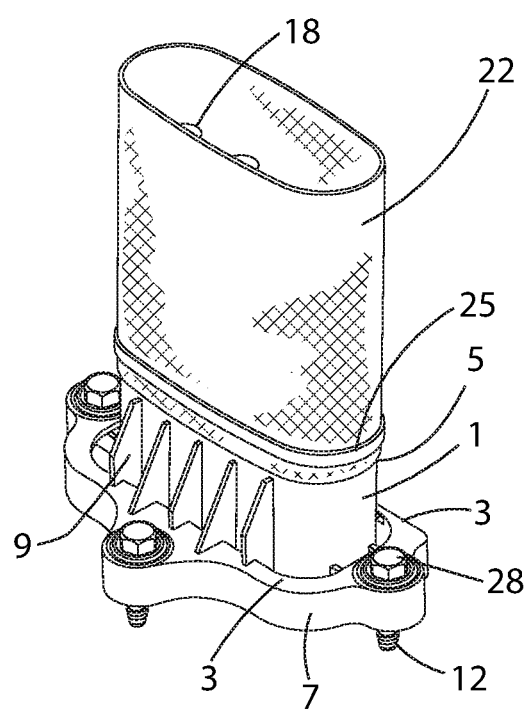
FIG. 2B is a perspective view of the fully assembled connector of this invention showing the braided shield fully secured to the outer housing with the metallic clamp.

FIG. 2A illustrates the connector 1 when fully assembled absent the braided shield 22, while FIG. 2B illustrates the connector 1 when fully assembled with the braided shield 22 secured onto the outer housing 5 by the metallic clamp 25. Further shown in FIG. 2A is the outer housing assembly 3 with the outer housing 5 that securely sits onto and within the outer-molded silicone seal 7 through which the bolts 12 are fastened with respective metallic compression limiters 28, which are made of aluminum or the like. As later discussed, the set of cables 18 extend through an upper portion 30 of the outer housing 5.

In FIG. 2B, covered by the metallic braided shield 22 are the set of cables 18. The metallic clamp 25 ensures that the bottom portion 33 of the metallic braided shield 22 is connected to the upper portion 30 of the outer housing 5.

Figure 3A:
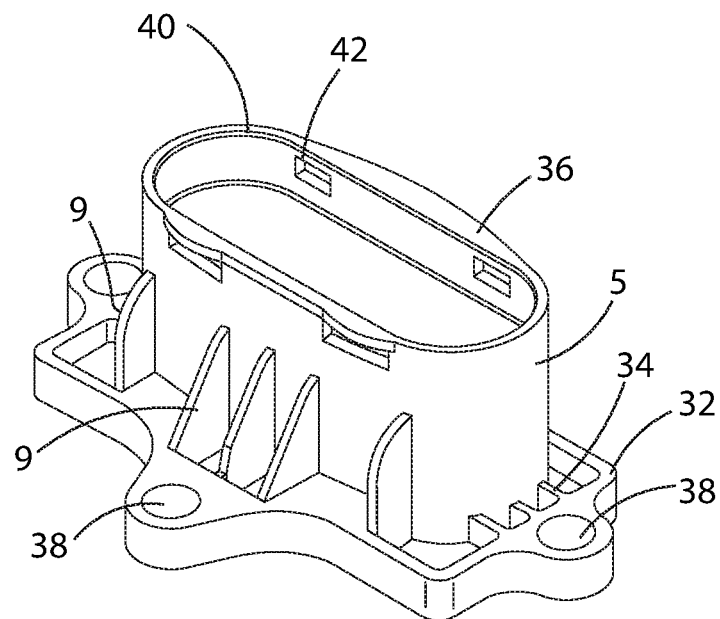

Upright in the vertical direction, as illustrated in FIG. 3A, is the outer housing 5 having the base 32 with horizontal ribs 34 extending from a side of the base 32 towards a central portion 36 of the outer housing 5. Also shown in FIG. 3A, with respect to the outer housing 5 and as discussed earlier, are the extending side portions or ribs 9 and side apertures 38 for accommodating therein, along with the silicone seal 7, the respective bolts 12 and the respective metallic compression limiters 28. The outer housing 5 is preferably made of a metal-infused plastic, while the bolts 12 are preferably made of steel or the like.

Passing through the central portion 36 of the outer housing 5 is a central opening 40 for accommodating therein, in full, the inner housing 14 and the cable reinforcement retainer assembly 16, and for further accommodating therein, in part, the set of cables 18. Apertures 42 pass through an upper portion of the outer housing 5.

Figure 3B:
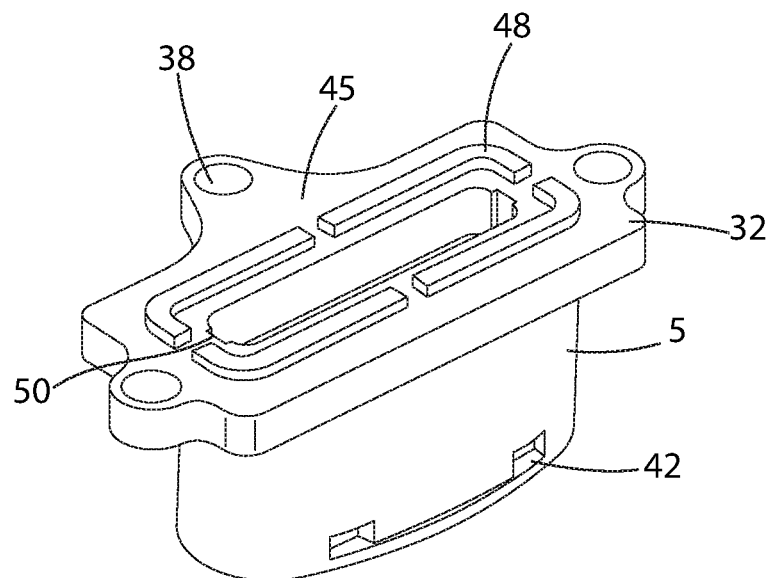
FIG. 3B is a bottom perspective view of the outer housing.

Illustrated in FIG. 3B is the bottom end portion 45 of the outer housing 5. The bottom end portion 45 is substantially flat and includes at least a pad 48 extending therefrom. The pad 48 surrounds a bottom opening or aperture 50 passing through the bottom end portion 45 of the base 32 of the outer housing 5. When the outer housing 5 is mounted onto an associated device 210 (see, FIG. 15), the pad 48 provides the necessary means for substantially deleting or substantially reducing any occurrence of EMI. The bottom opening or aperture 50 is preferably smaller in size than the central aperture 40 of the outer housing 5, and communicates therewith.

Figure 4A:
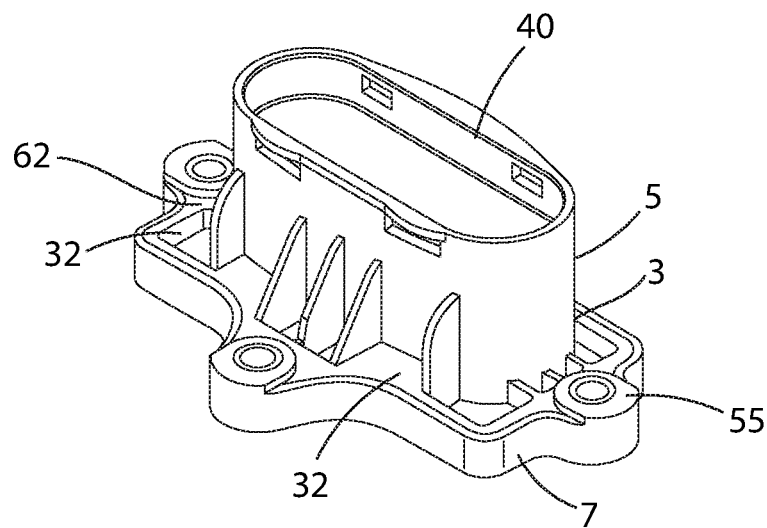
FIG. 4A is a top perspective view of the outer housing surrounded on a bottom periphery thereof with a corresponding over-molded silicone seal.

FIG. 4A shows the outer housing assembly 3, which comprises the outer housing 5 and the over-molded silicone seal 7, the base 32 of the outer housing 5 sitting onto and within the over-molded silicone seal 7. The over-molded silicone seal 7 provides a sealing and insulation layer for galvanic corrosion protection between the connector 1 and the device 210.

Figure 4B:
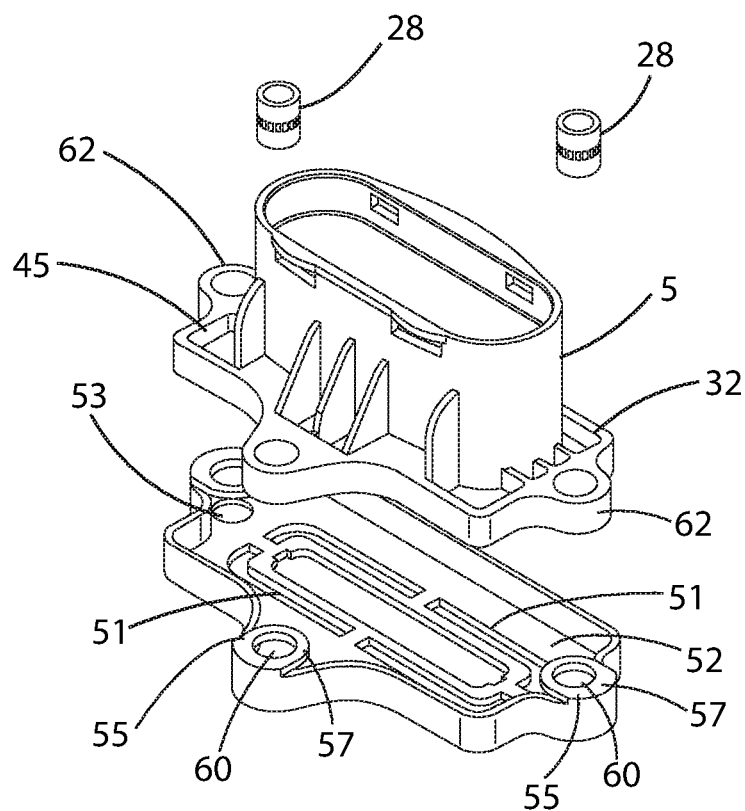
FIG. 4B is an exploded view of the outer housing and the corresponding over-molded silicone seal with the compression limiters that fit within coincident apertures of the outer housing and the silicone seal.

In FIG. 4B, illustrated is an exploded view of the outer housing assembly 3 showing the outer housing 5 and its corresponding over-molded silicone seal 7. As described earlier with respect to the outer housing 5 shown in FIGS. 3A and 3B, the outer housing 5 includes a base 32 with a bottom end portion 45. As also described with respect to FIG. 3B, the base end portion 45 includes the pad 48, which fits and passes through elongated slits 51 passing through a base 52 of the over-molded silicone seal 7 (see, FIG. 4B). As further described with respect to FIG. 3B, the substantially flat bottom end portion 45 of the outer housing 5 sits and mounts onto the base portion 52 of the over-molded silicone seal 7, as shown in FIGS. 4A and 4B. In the over-molded silicone seal 7, shown in FIG. 4B, the base portion 52 includes side apertures 53, while an upper portion 55 of the silicone seal 7 includes side members 57, each of the side member 57 having an aperture 60 passing therethrough. As shown in FIG. 4A, each upper portion 55 of the silicone seal 7 fits onto one of the side extending portions 62 of the base 32 of the outer housing 5. Thus, each aperture 60 of each one of the side member 57 of the silicone seal 7 corresponds to a respective one of the apertures 38 of the base 32 of the outer housing 5 for respectively accommodating therein the metallic compression limiters 28.

Figure 5A:
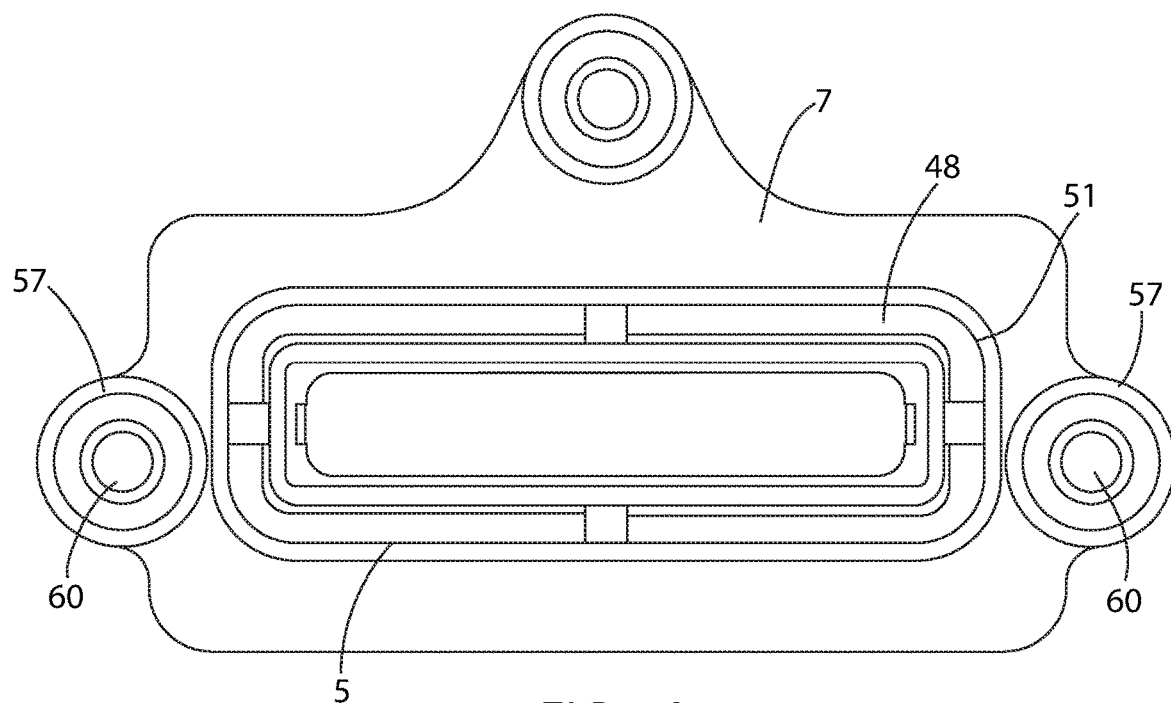
FIG. 5A is a bottom elevational view of a base end portion of the outer housing assembly showing a pad of the outer housing passing through elongated slits of a base of the over-molded silicone seal.
Figure 5B:
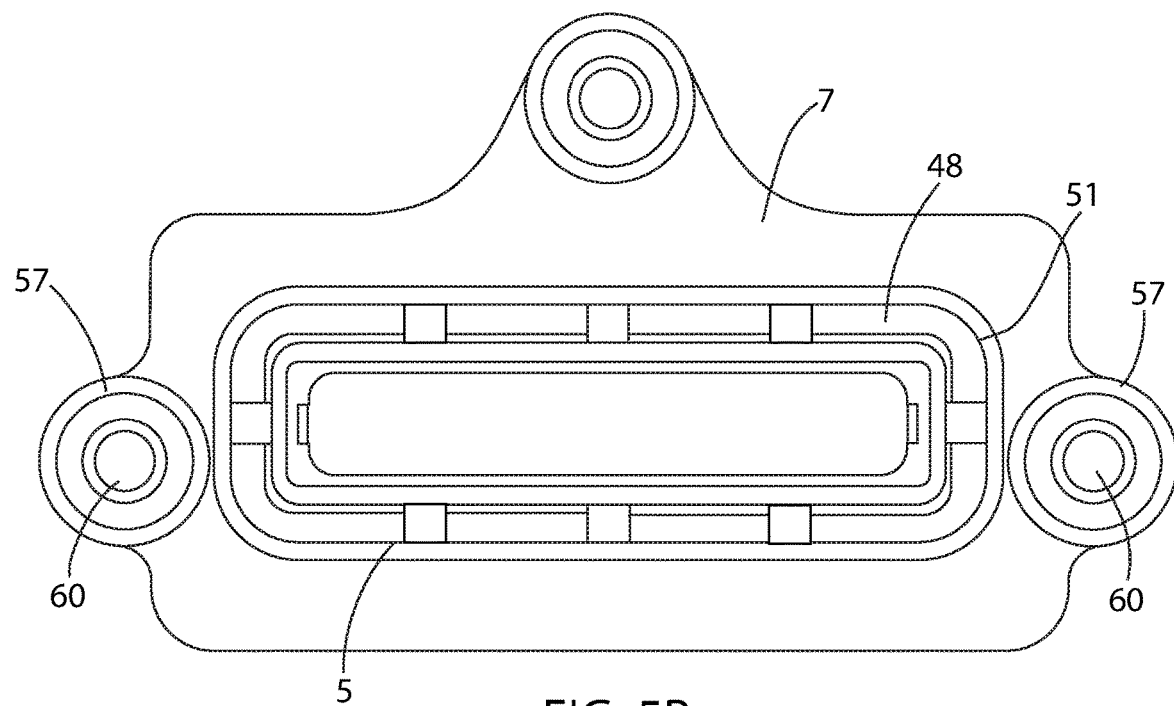
FIG. 5B is a bottom elevational view of the base end portion of the outer housing assembly showing another embodiment or pattern of the pad of the outer housing passing through another embodiment or pattern of the corresponding elongated slits of the base of the over-molded silicone seal.

FIG. 5A illustrates the bottom end portion 45 of the outer housing assembly 3 with the pads 48 of the outer housing 5 passing through the elongated slits 51 of the silicone seal 7 when the outer housing 5 sits and mounts onto the over-molded silicone seal 7. FIG. 5B illustrates the bottom end portion 45 of the outer housing assembly 3 with the pads 48 of a different embodiment or pattern passing through corresponding elongated slits 51 of a different embodiment or pattern of the silicone seal 7 when the outer housing 5 sits and mounts onto the over-molded silicone seal 7.

Figure 6:
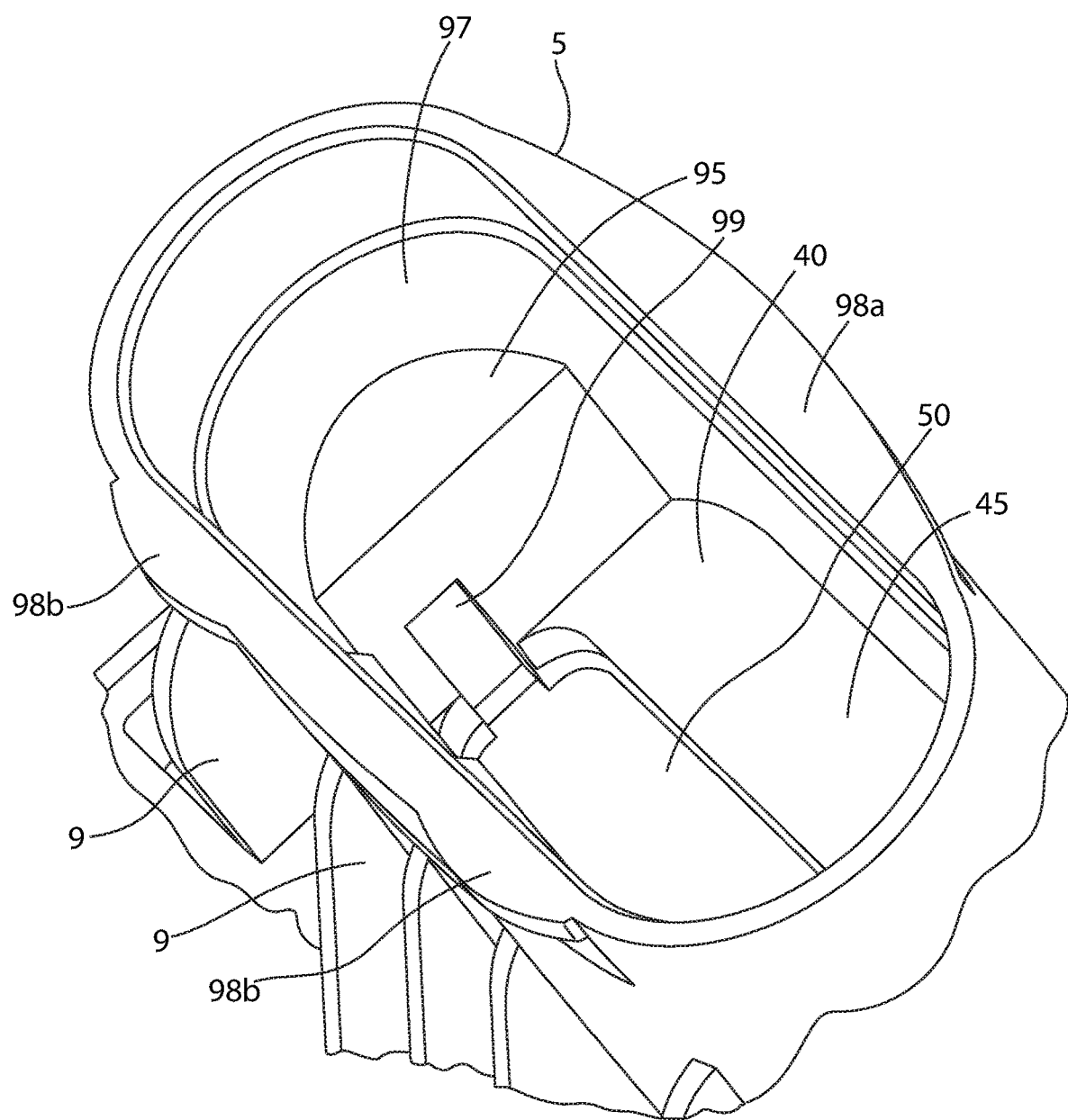
FIG. 6 is a top perspective view of the outer housing showing the inner surface thereof through a central opening thereof.

FIG. 6 is a top perspective view of the outer housing 5 showing the inner surface thereof through a central opening 40 thereof. As can be seen through the central opening 40 of the outer housing 5, as illustrated in FIG. 6, opposite to the central opening 40 and communicating therewith is a bottom opening or aperture 50 passing through the bottom end portion 45 of the base 32 of the outer housing 5. As further shown in FIG. 6, an inner ledge 95 extends from an inner surface 97 of the outer housing 5. Although not shown in FIG. 6, a similar type of inner ledge 95 extends from the opposite side of the inner surface of the outer housing 5. Also shown in FIG. 6 are outer ledges 98a, 98b extending from an upper portion of the outer housing 5.

Figure 7A:
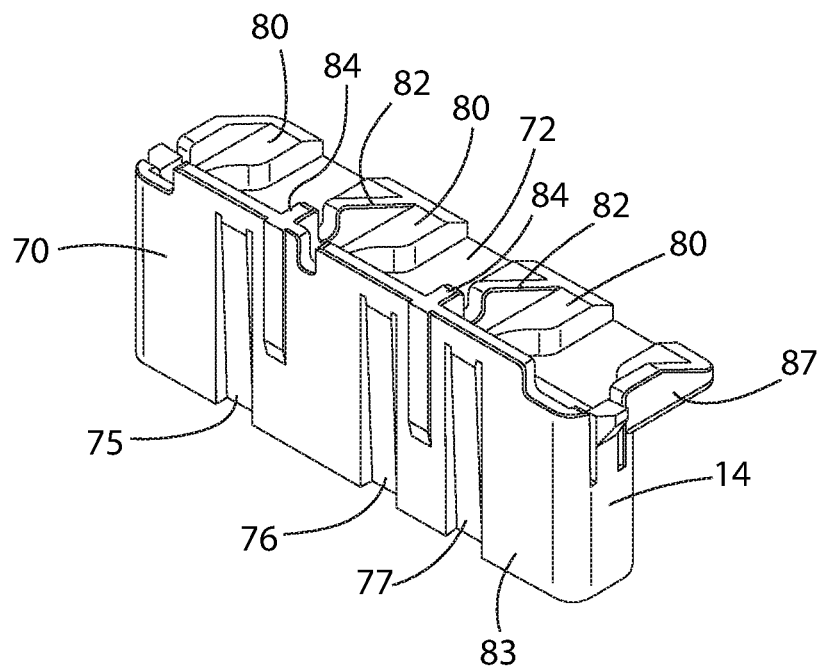

Next described in detail is the inner housing 14, which is accommodated within the outer housing 5 and sits onto the base 32 thereof. The inner housing 14 is preferably made of nylon or the like. The inner housing 14 (preferably made of nylon or the like) provides separation between conductive parts (e.g., the outer housing 5 made of metal-infused plastic or the like and the cable terminals 107 secured inside the inner housing 14). FIG. 7A is a top perspective view of the inner housing 14 showing a front portion 70 and a top portion 72 thereof. The front portion 70 of the inner housing 14 has flexible members 75, 76, 77. The top portion 72 of the inner housing 14 has extending therefrom first portion 80, second portion 82, and third portion 84. The inner housing 14 is generally, as shown in FIG. 7A, an upside down (or inverted) substantially L-shaped structure with a downwardly extending member 83 and a back extending member 87.

Figure 7B:
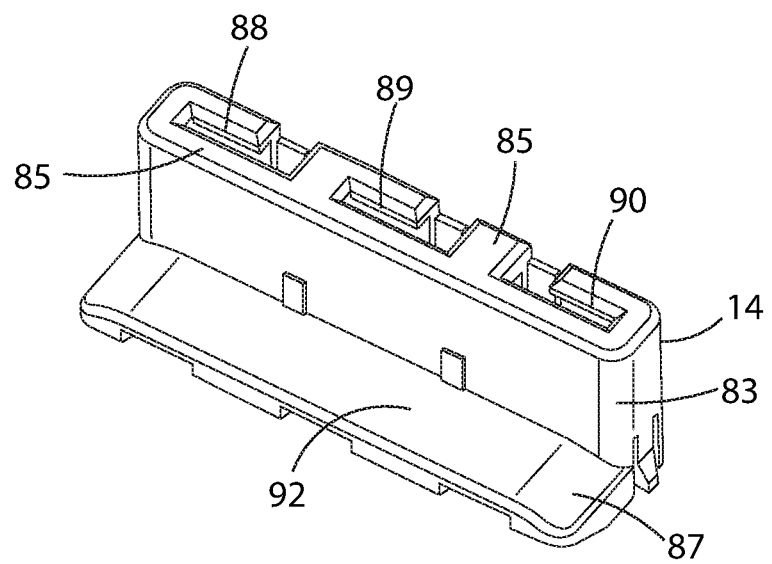
FIG. 7B is a bottom perspective view of the inner housing.

FIG. 7B is a bottom perspective view of the inner housing 14. Shown in FIG. 7B is a bottom end portion 85 of the inner housing 14, the bottom end portion 85 having slots 88, 89, 90 passing therethrough. A back extending member 87 of the inner housing 14 is similarly shown in FIG. 7B as having a bottom surface 92 thereof.

Figure 8:
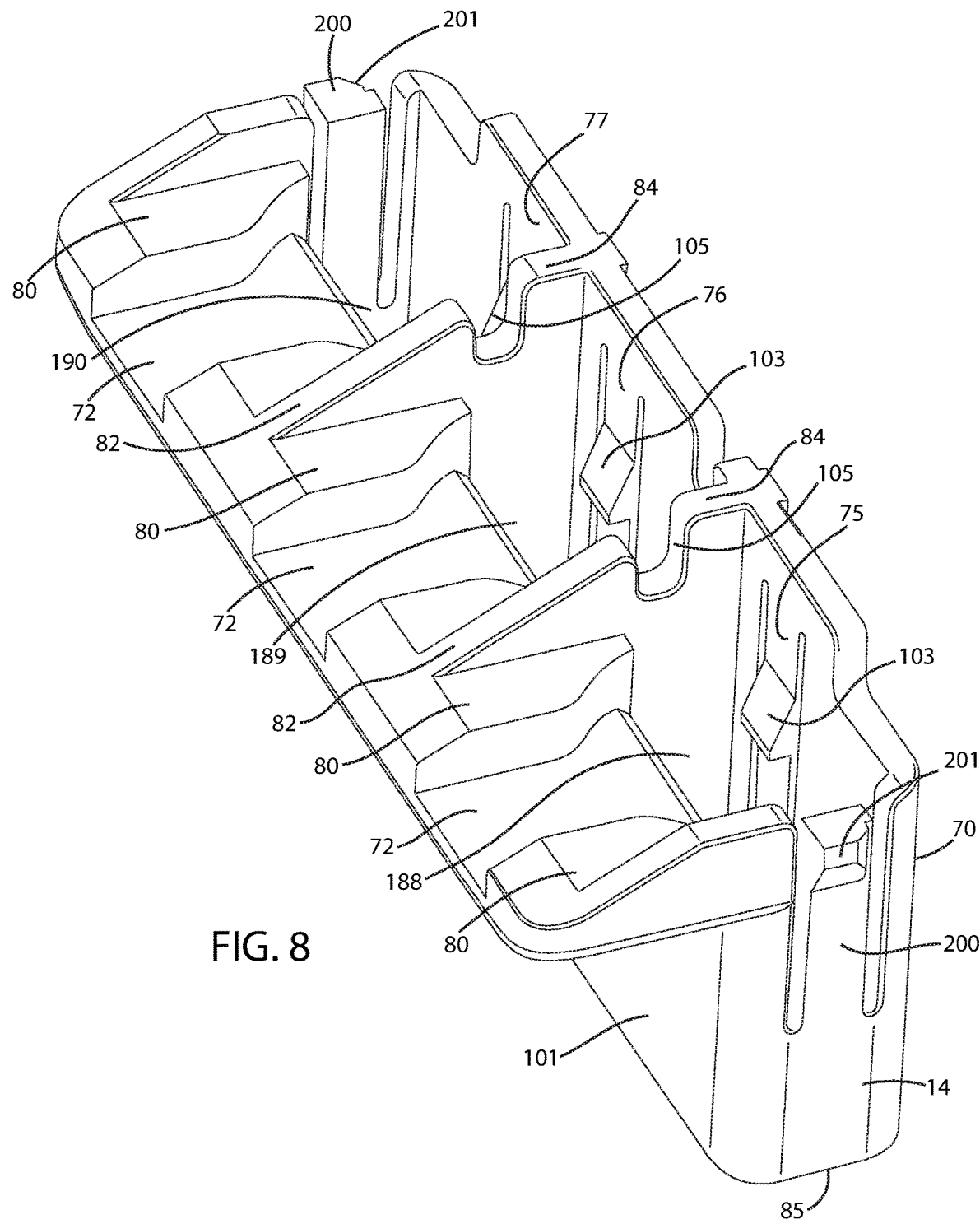
FIG. 8 shows yet another top perspective view of the inner housing illustrating a back portion and the top portion thereof.

FIG. 8 shows yet another top perspective view of the inner housing 14 illustrating a back portion 101 and the top portion 72 thereof. The back portion 101 of the inner housing 14 is opposite the front portion 70 of the inner housing 14 shown in FIG. 7A. Similarly shown in FIG. 8 are the flexible members 75, 76, 77 in the front portion 70 of the inner housing 14. Each of the flexible members 75, 76, 77 has an inclined ledge 103. Extending from the front portion 70 are the first portion 80, the second portion 82, and the third portion 84 (see, also, FIG. 7A). Each second portion 82 extends at an incline relative to the substantially flat and horizontal first portion 80. The top portion 72 of the inner housing 14 is preferably similarly flat and horizontal. Between the second portion 82 and the third portion 84 is a substantially concave portion or indentation portion 105. Upper slots 188, 189, 190 are also shown in FIG. 8, the upper slots 188, 189, 190 communicating with the lower slots 88, 89, 90, respectively, of the inner housing 14 as shown in FIG. 7B.

Figure 9:
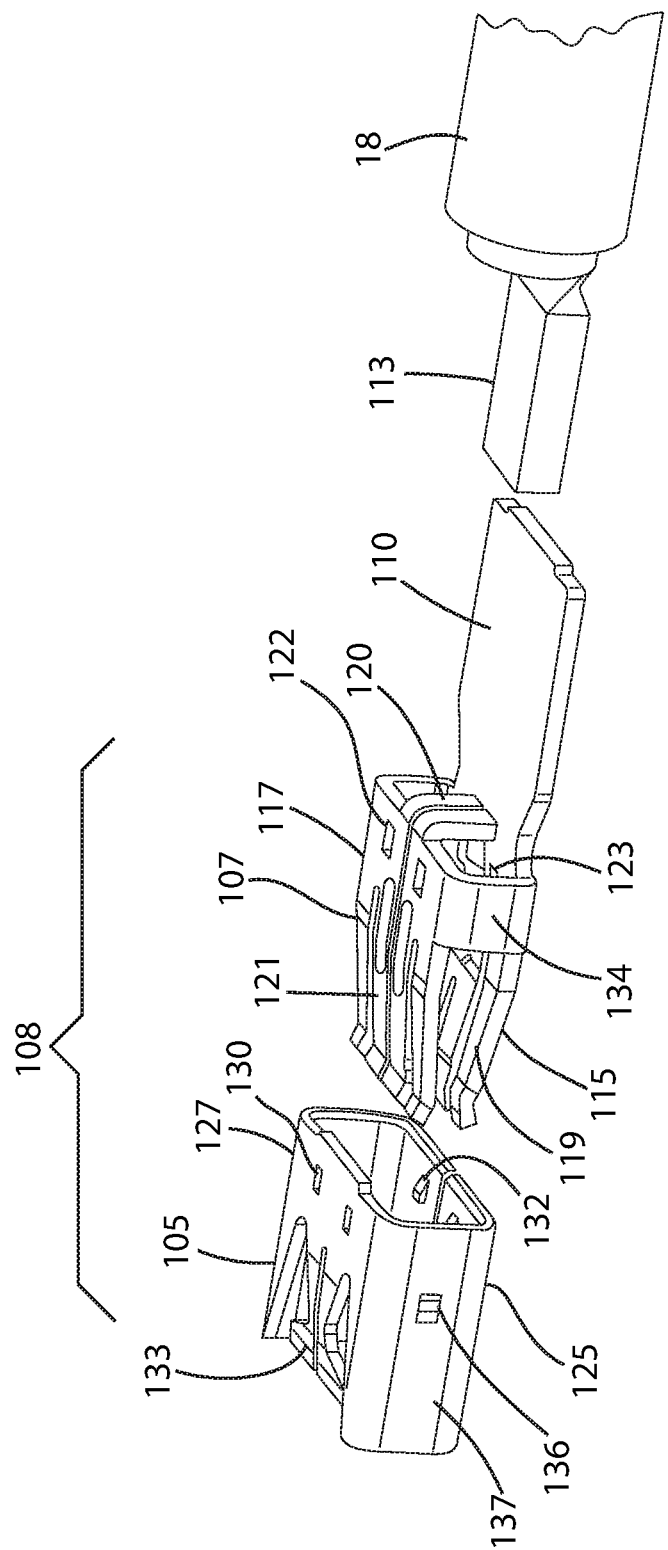
FIG. 9 shows an exploded perspective view of a cable reinforcement retainer assembly, the cable reinforcement retainer assembly having a clamp (or retainer) mounted onto and surrounding an end terminal.

FIG. 9 shows an exploded perspective view of the cable reinforcement retainer assembly 108 (also referred to as reference number 16 in FIG. 1), each cable reinforcement retainer assembly 108 having a clamp (or retainer) 105 mounted onto and surrounding a preferably flexible (although not limited thereto) end terminal 107. The end terminal 107 has a substantially flat end portion 110, which attaches to a cable terminal 113 attached to a cable 18. The terminal 107 includes a first side portion 115 and a second side portion 117. The first side portion 115 includes a plurality of preferably flexible fingers 119, and the second side portion 117 also includes a plurality of preferably flexible fingers 121. Although not limited thereto, the flexible fingers 119 and the flexible fingers 121 are substantially symmetrical. Attached to the second side portion 117 is at least an extending member 120 that extends towards the first side portion 115. Each of the first side portion 115 and the second side portion 117 of the end terminal 107 includes at least an indentation or aperture 122, 123, respectively.

The clamp (or retainer) 105 of the cable reinforcement retainer assembly 108 includes a first side portion 125 and a second side portion 127. Each of the first side portion 125 and the second side portion 127 of the clamp 105 includes at least an inwardly protruding member 130, 132, respectively. The protruding members 130, 132 enter the indentations or apertures 122, 123, respectively, when the end terminal 107 is accommodated within the clamp 105 during assembly thereof. Further shown in FIG. 9 is at least a flexible member 133 in the second side portion 127 of the clamp 105. Although the flexible member 133 is shown in FIG. 9 as a pair of flexible members 133, it is not limited thereto.

At least a side portion 134 of the terminal 107 is prevented from traversing pass at least an inwardly protruding member 136 located at a side 137 of the clamp 105. It is preferred that each of the opposing sides 137 of the clamp 105 includes an inwardly protruding member 136, and that the end terminal 107 includes opposing sides 134.

Figure 10:
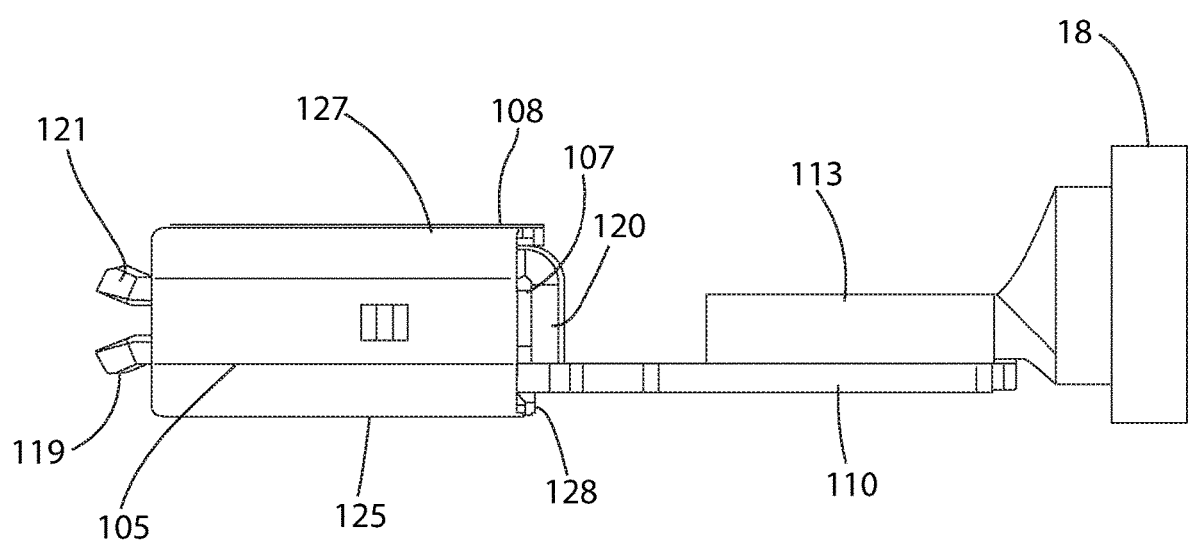
FIG. 10 illustrates a side elevational view of the cable retainer assembly as being fully assembled and an end portion of the end terminal of the clamp being coupled to a terminal of a cable.

The cable reinforcement retainer assembly 108 is shown in FIG. 10 as being fully assembled and the end portion 110 of the end terminal 107 of the clamp 105 being coupled to the terminal 113 of the cable 18. The cable reinforcement retainer assembly 108, as illustrated in FIG. 10, shows the end portion of at least one of the flexible members 121 of the second side portion 117 of the end terminal 107, and an end portion of at least one of the flexible members 119 of the first side portion 115 of the end terminal 107. See, also, FIG. 9.

FIG. 11A is an elevational view of the first side portion 115 of the end terminal 107 and the first side portion 125 of the clamp 105 of the cable reinforcement retainer assembly 108. The first side portion 125 of the clamp 105 includes at least a flexible member 135. Although not limited thereto, shown in FIG. 11A, is a pair of flexible members 135 with an elongated slit 138 therebetween. Also shown in FIG. 11A are the inwardly protruding members 132 in the first side portion 125 of the clamp 105, which are preferably inclined for easy entry into the indentations or apertures 123 of the end terminal 107 (see, FIG. 9) when the end terminal 107 is moved inside the clamp 105. Once the inwardly protruding members 132 have been accommodated within the indentations or apertures 123, the end terminal 107 is held inside the clamp 105. That is, the inwardly protruding members 132 of the clamp 105 are preferably inclined for allowing the terminal 107 to be inserted into the clamp 105; and once the inwardly protruding members 130, 132 have been respectively accommodated within the indentations or apertures 122, 123 of the end terminal 107, the terminal 107 is prevented from being pulled out from the clamp 105. As described earlier with respect to FIG. 9, the opposing sides 134 of the end terminal 107 are held by the inwardly protruding members 136 of the clamp 105, and prevents the retainer 107 from being pushed further forward into the clamp 105. When thus assembled, the cable retainer assembly 108, as illustrated in FIGS. 10, 11A, and 11B, has the ends of the flexible members 119, 121 of the terminal 107 extending outside of the clamp 105.

Illustrated in FIG. 11B is an elevational view of the cable retainer assembly 108 showing the second side portion 117 of the end terminal 107 and the second side portion 127 of the clamp 105. Illustrated here are the inwardly protruding members 130 and the pair of flexible members 133 of the clamp 105, and the ends of the flexible members 121 of the second side portion 117 of the terminal 107 extending outside of the clamp 105 when the cable reinforcement retainer assembly 108 is assembled as shown. Further shown in FIG. 11B is an elongated slit 140 (shown here as partially passing through the second side portion 127 of the clamp 105) between the pair of flexible members 133.

Figure 12A:
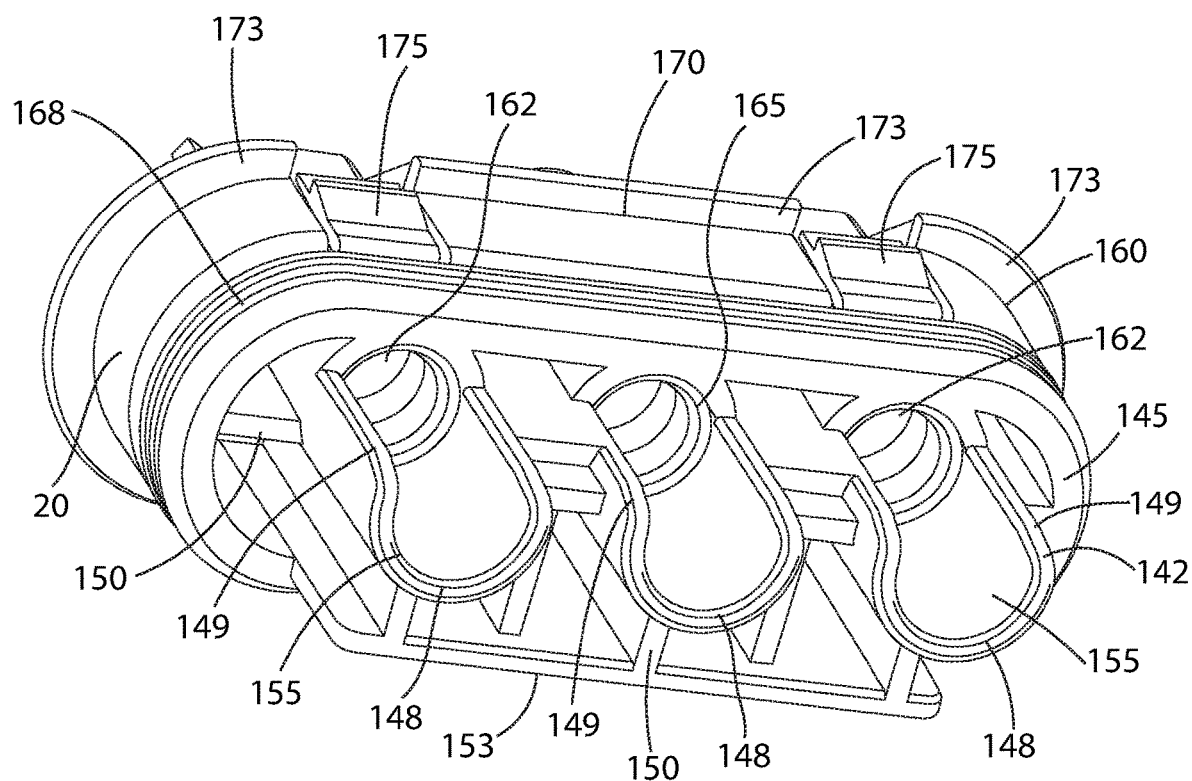

FIG. 12A illustrates a perspective view of a front portion 142 and a bottom portion 145 of the back cover 20. Shown here is at least a substantially half-circular tubular member 148 having a front portion 149 and extending from the bottom portion 145 of the back cover 20. For strength and stability, the half-circular tubular members 148 are joined to bridge (or rib) members 150 respectively connected to the back cover 20 and extending to the sides 153 of the back cover 20. Openings 155 of the tubular members 148 extend toward a middle portion 160 of the back cover 20. Inside the middle portion 160 are substantially circular apertures 162, which respectively communicate with the tubular members 148. Inside each of the circular apertures 162 is a circular fitting silicone seal 165; and on the outer periphery of the middle portion 160 of the back cover 20 is an over-molded silicone seal 168. The back cover 20 has the circular fitting silicone seal 165 for interface with the cable 18 and the over-molded silicone seal 168 for interface with the inner surface of the outer housing 5. With the cables 18 being respectively accommodated within the circular fitting silicone seals 165, the back cover 20 acts as a terminal position assurance (TPA) device for the high voltage connector 1 of this invention. Surrounding an upper portion 170 of the back cover 20 are ledges 173; and between the ledges 173 are inclined protruding members 175, as shown in FIG. 12A.

Figure 12B:
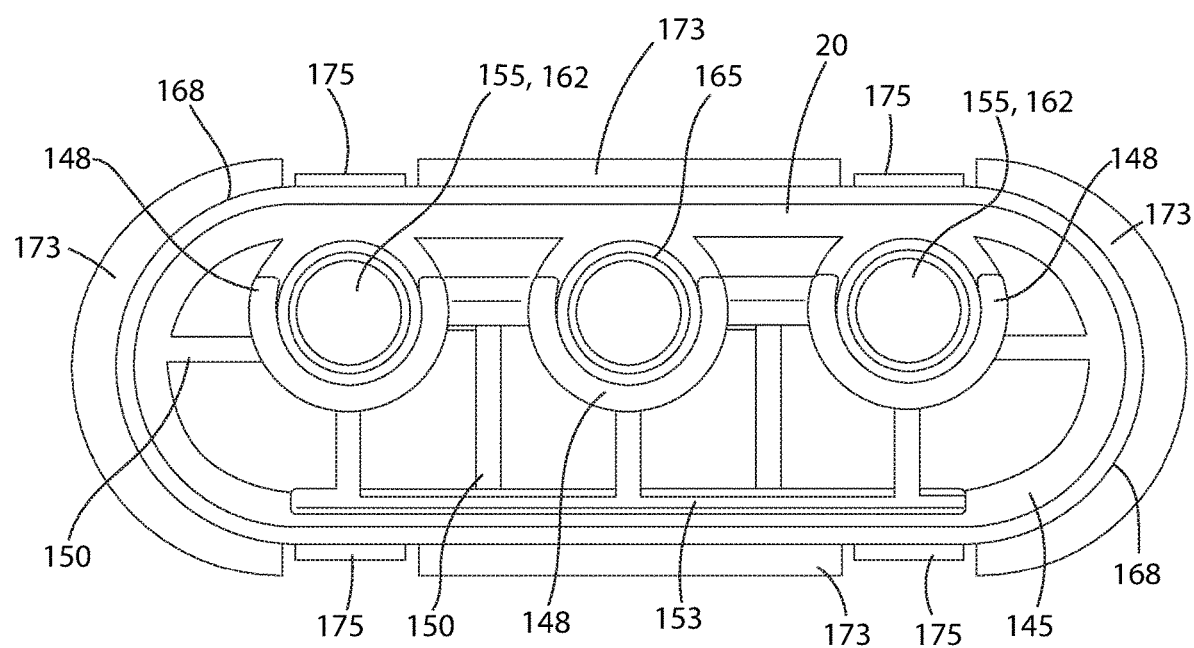
FIG. 12B illustrates an elevational view of the bottom portion of the back cover.

The above-described elements of the back cover 20, as shown in FIG. 12A, are similarly shown in the elevational view of the bottom portion 145 of the back cover 10 illustrated in FIG. 12B. Shown here are the tubular members 148, and bridge (rib) members 150 connected to the sides 153. Also shown in FIG. 12B are the respective openings 155 of the tubular members 148, which communicate with the circular apertures 162 thereof, the respective circular fitting silicone seals 165 inside the circular apertures 162, and the silicone seal 168 surrounding the outer periphery of the middle portion 160 of the back cover 20. Shown in FIG. 12B are the ledges 173 surrounding, on all sides, the upper portion 170 (see, FIG. 12A) of the back cover 20, and the inclined protruding members 175 extending on opposing sides of the back cover 20, as shown in FIG. 12B.

Figure 13A:
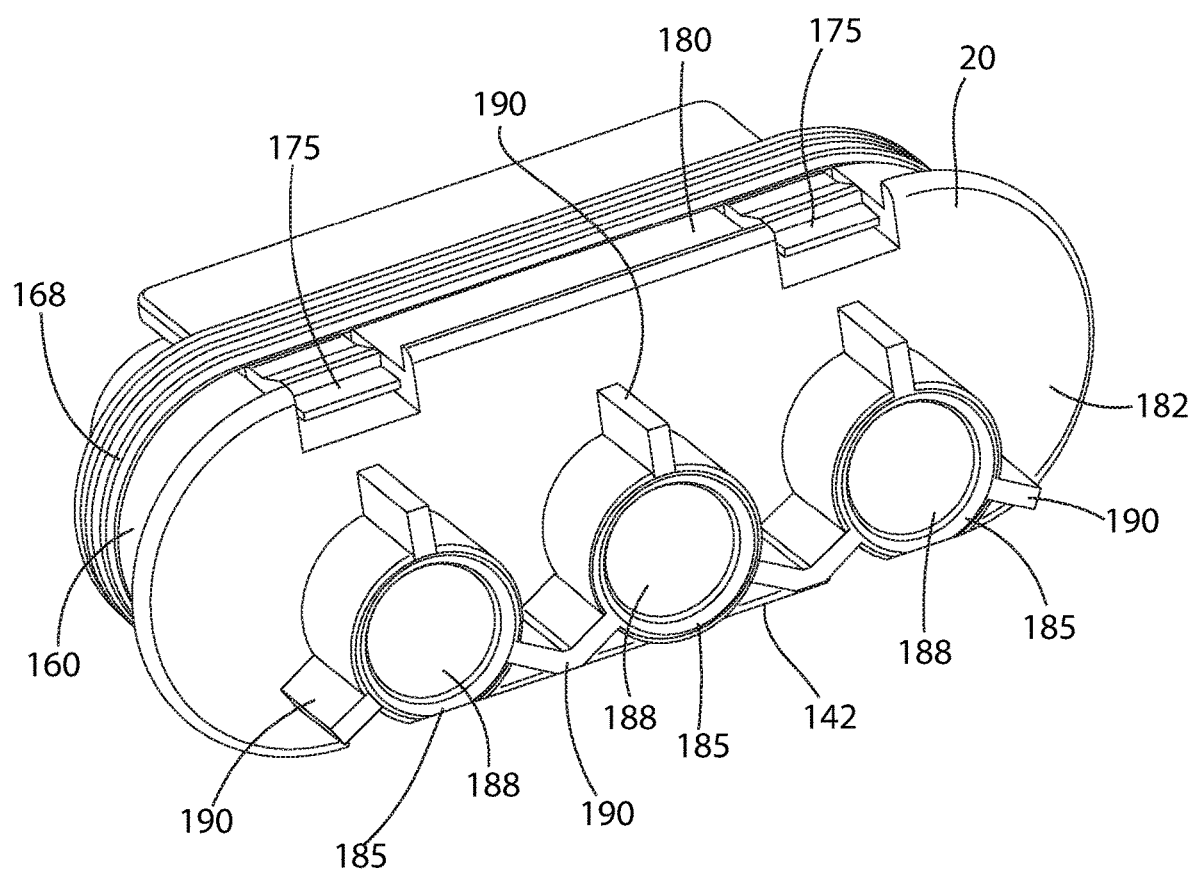

FIG. 13A is a perspective view of a back portion 180 and a top portion 182 of the back cover 20. Shown on the back portion 180 are the inclined protruding members 175. Opposite the back portion 180 of the back cover 20 is the front portion 142 thereof. Extending from the top portion 182 are top tubular members 185 with respective openings 188 that respectively communicate with the circular apertures 162 extending through the middle portion 160 of the back cover. As in the half-circular tubular members 148 extending from the bottom portion 145, the top tubular members 185 are similarly surrounded by bridge (or rib) members 190. Surrounding the outer periphery of the middle portion 160 is the silicone seal 168.

Figure 13B:
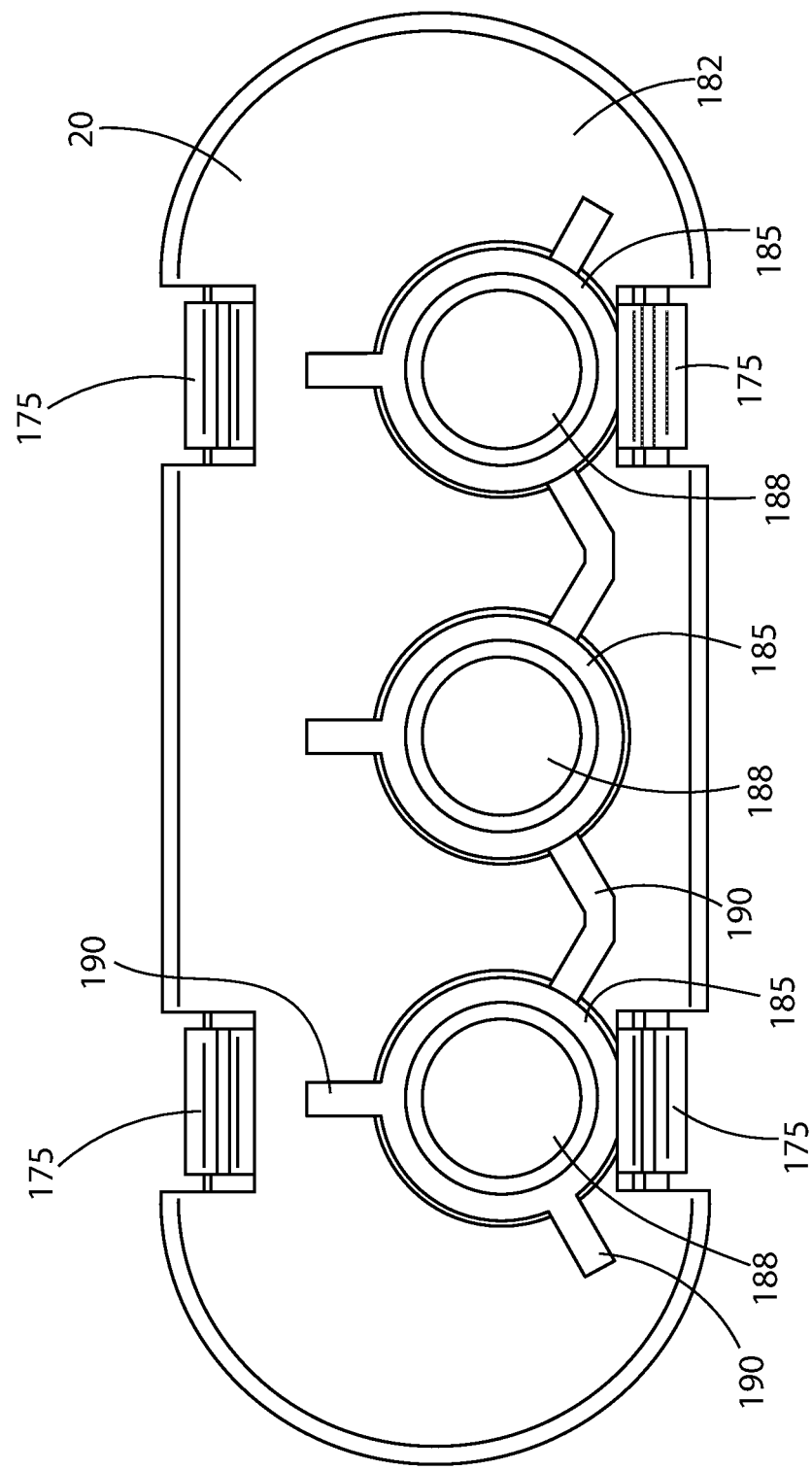
FIG. 13B is an elevational view of the top portion of the back cover.

FIG. 13B is an elevational view of the top portion 182 of the back cover 20 showing the respective openings 188 of the top tubular members 185 and the associated bridge (or rib) members 190. Also shown in FIG. 13B are the respective circular fitting silicone seals 165, discussed earlier with respect to FIG. 13A, and the inclined protruding members 175 located in the top portion 182 at opposing sides thereof.

Figure 14A:
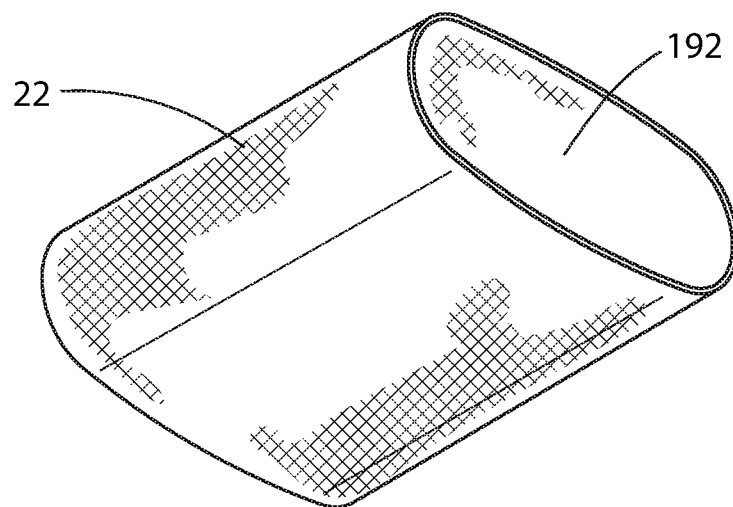
FIG. 14A is a perspective view of the braided shield.
Figure 14B:
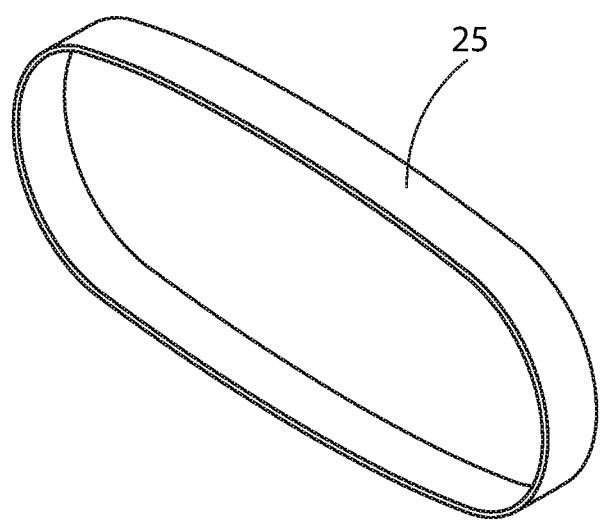
FIG. 14B is a perspective view of the metallic clamp.

FIG. 14A is a perspective view of the braided shield 22 having an internal opening 192 extending along the entire length thereof. The braided shield 22 is made of metal, preferably stainless steel or the like. FIG. 14B is a perspective view of the metallic clamp 25, which is substantially ring-like in shape and is made of stainless steel or the like.

In the high voltage connector 1 of this invention, the ground system is provided with the connection of the connector 1 to the associated aluminum device 210 by establishing contacts among the metal-infused conductive plastic outer housing 5, the aluminum compression limiters 28, the stainless steel bolts 12, and the associated aluminum device 210. The substantial reduction or elimination of EMI is provided by the metal-infused pads 48 of the outer housing 5 in conjunction with the braided shield 22 extending along the paths of the cables 18, the metal-infused pads 48 contacting the associated aluminum device 210. This invention further provides a galvanic corrosion prevention with the base 52 of the non-conducting over-molded silicone seal 7 shielding the metal-infused conductive plastic outer housing 5 and the associated aluminum device 210 from electrolytic fluid to prevent galvanic corrosion. Galvanic corrosion is further prevented with the side members 57 of the upper portion 55 of the silicone seal 7 shielding the metal-infused conductive plastic outer housing 5 and the aluminum compression limiters 28, and further shielding the stainless bolts 12 and the associated aluminum device 210 from electrolytic fluid to prevent galvanic corrosion.

The method for assembling the high voltage connector of this invention is hereinafter described in detail. The bolts 12 are respectively secured into the compression limiters 28, which are inside the side apertures 38 of the outer housing 5, thereafter mounting the outer housing 5, along with the outer-molded silicone seal 7, onto the device 210 (see, FIG. 15) onto which the outer housing 5 and subsequently the connector 1 is to be mounted. The bolts 12 securely fasten the connector 1 to the device 210, and provides grounding among the braided shield 22, the outer housing 5, and the device 210. Preferably, the stainless steel bolts 12 and the aluminum compression limiters 28 provide the contact between the connector 1 and the device 210 to ground the system.

With the outer housing 5, along with the outer-molded silicone seal 7, having been mounted onto the device, the inner housing 14 is then inserted or slid into the central opening 40 of the outer housing 5 so as to mount the inner housing 14 onto the bottom end portion 45 of the base 32 of the outer housing 5 until a clicking sound or the like is heard, which assures that the inner housing 14 is secured inside the outer housing 5. The over-molded silicone seal 7 provides a sealing and insulation layer for galvanic corrosion protection between the connector 1 and the device 210. Preferably a plurality of pre-assembled cable reinforcement retainer assemblies 108 with their respective cables 18 is inserted into the inner housing 14 until a clicking sound or the like is heard in which case the back cover 20 slides along the cables 18 through the central opening 40 and into the outer housing 5 until a clicking sound or the like is again heard once the back cover 20 is secured inside the outer housing 5. At such time, the partially assembled connector 1 is as shown in FIG. 2A. Thereafter, the braided shield 22 is mounted onto the outer housing 5, and the clamp 25 is slid down over the braided shield 22 towards the bottom portion of the braided shield 22 and rests thereonto and provides the conductive contact between the braided shield 22 and the outer housing 5.

More particularly, when the inner housing 14 is inserted into the central opening 40 of the outer housing 5, the inner housing 14 is lowered towards the bottom end portion 45 of the base 32 of the outer housing 5, the downwardly extending member 83 of the inner housing 14 enters (or slides into) the bottom opening or aperture 50 of the outer housing 5. Then, the bottom surface 92 of the back extending member 87 of the inner housing 14 mounts onto the bottom end portion 45 of the outer housing 5. Substantially thereupon, the upper portion 201 of the flexible latch member 200 (see, FIG. 8) on opposing sides of the inner housing 14 respectively enter indentations 99 (see, FIG. 6) on opposing inner sides of the outer housing 5 at which time, a clicking sound or the like is heard. The clicking sound or the like thus indicates that the inner housing 14 is securely mounted inside the outer housing 5. The inner housing 14 (preferably made of nylon or the like) provides separation between conductive parts (e.g., the outer housing 5 made of metal-infused plastic or the like and the cable terminals 107 secured inside the inner housing 14.

Thereafter, preferably a plurality of pre-assembled cable reinforcement retainer assemblies 108 (see, FIG. 10) with their accompanying respective cables 18 have their accompanying cables 18 inserted inside the respective circular fitting silicone seals 165 of the respective circular apertures 162 of the back cover 20.

The preferably pre-assembled cable reinforcement retainer assemblies 108 are then lowered towards the central opening 40 of the outer housing 5. With the first side portions 125 of the clamps 105 respectively facing the front portion 70 of the inner housing 14, the cable reinforcement retainer assemblies 108 are lowered through the central opening 40 of the outer housing 5 and subsequently respectively through upper slots 188, 189,190 (see, FIG. 8), but do not pass beyond the slots 88, 89, 90 of the bottom end portions 85 of the inner housing 14 (see, FIG. 7B). The cable reinforcement retainer assemblies 108 respectively travel downward through the upper slots 188, 189, 190 of the inner housing 14 and the clamps 105 respectively push, while traveling downward, the inclined ledges 103 of the flexible members 75, 76, 77 (see, FIG. 8) of the inner housing 14 until each upper end 128 (see, FIG. 10) of each clamp 105 respectively settles beneath one of the inclined ledge 103 of the inner housing 14 (see, FIG. 8); thereupon, a clicking sound or the like is heard, which indicates that the clamps 105 and consequently the cable reinforcement retainer assemblies 108 are securely fastened within the inner housing 14.

Thereafter, the back cover 20 is slid downwards, along the cables 18, towards the outer housing 5 and through the central opening 40 thereof until the inclined protruding members 175 (see, FIGS. 13A and 13B) at opposing sides of the back cover 20 respectively enter the apertures 42 (see, FIGS. 3A and 3B) passing through the upper portion of the outer housing 5 at which time a clicking sound or the like is heard to indicate that the back cover 20 has been securely fastened to the outer housing 5 with the cable reinforcement retainer assemblies 108 similarly fully secured inside the outer housing 5. That is, the back cover 20 pushes the inner housing 14 in place and ensures that the inner housing 14 is properly positioned in the outer housing 5.

Figure 15:
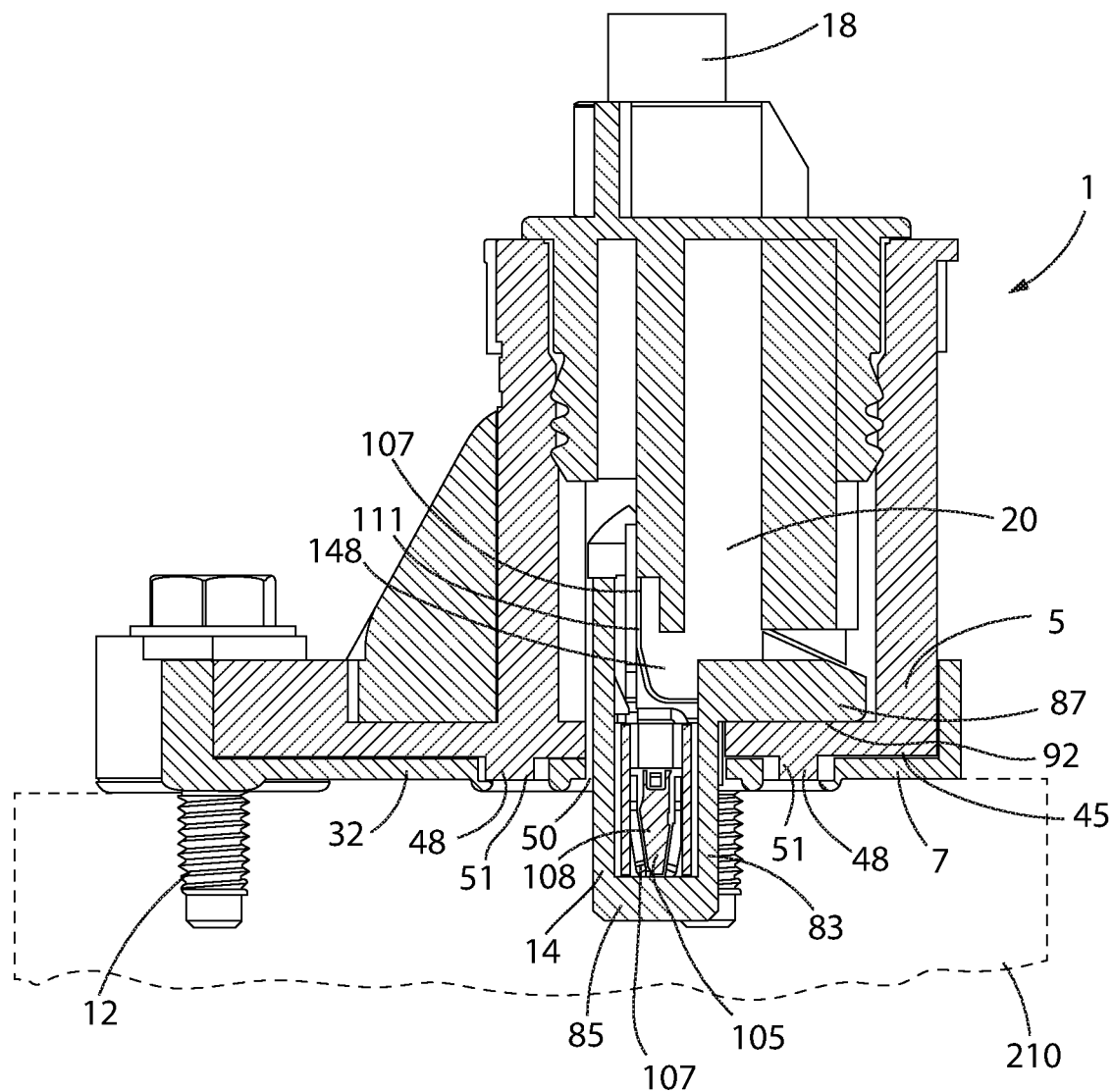
FIG. 15 is the fully assembled vertical high voltage connector of this invention showing a wedge (or impinging) mechanism for securing the cables in the inner housing contained within the outer housing.

As illustrated in FIG. 15, the vertical high voltage connector 1 of this invention is mounted onto a device 210 (e.g., an automotive transmission or the like) with the use of the bolts 12. The downwardly extending member 83 of the inner housing 14 is shown as having passed through the bottom opening or aperture 50 of the bottom end portion 45 of the base 32 of the outer housing 5 and through the over-molded silicone seal 7. The pads 48 of the bottom end portion 45 of the base 32 of the outer housing 5 are shown as being inside the elongated slots 51 of the over-molded silicone seal 7.

Further illustrated in FIG. 15 is the cable reinforcement retainer assembly 108 having the associated clamp 105 seated onto the inner surface of the bottom end portion 85 of the inner housing 14, and the bottom surface 92 of the back extending member 87 of the inner housing being mounted onto the bottom end portion 45 of the outer housing 5.

Figure 16:
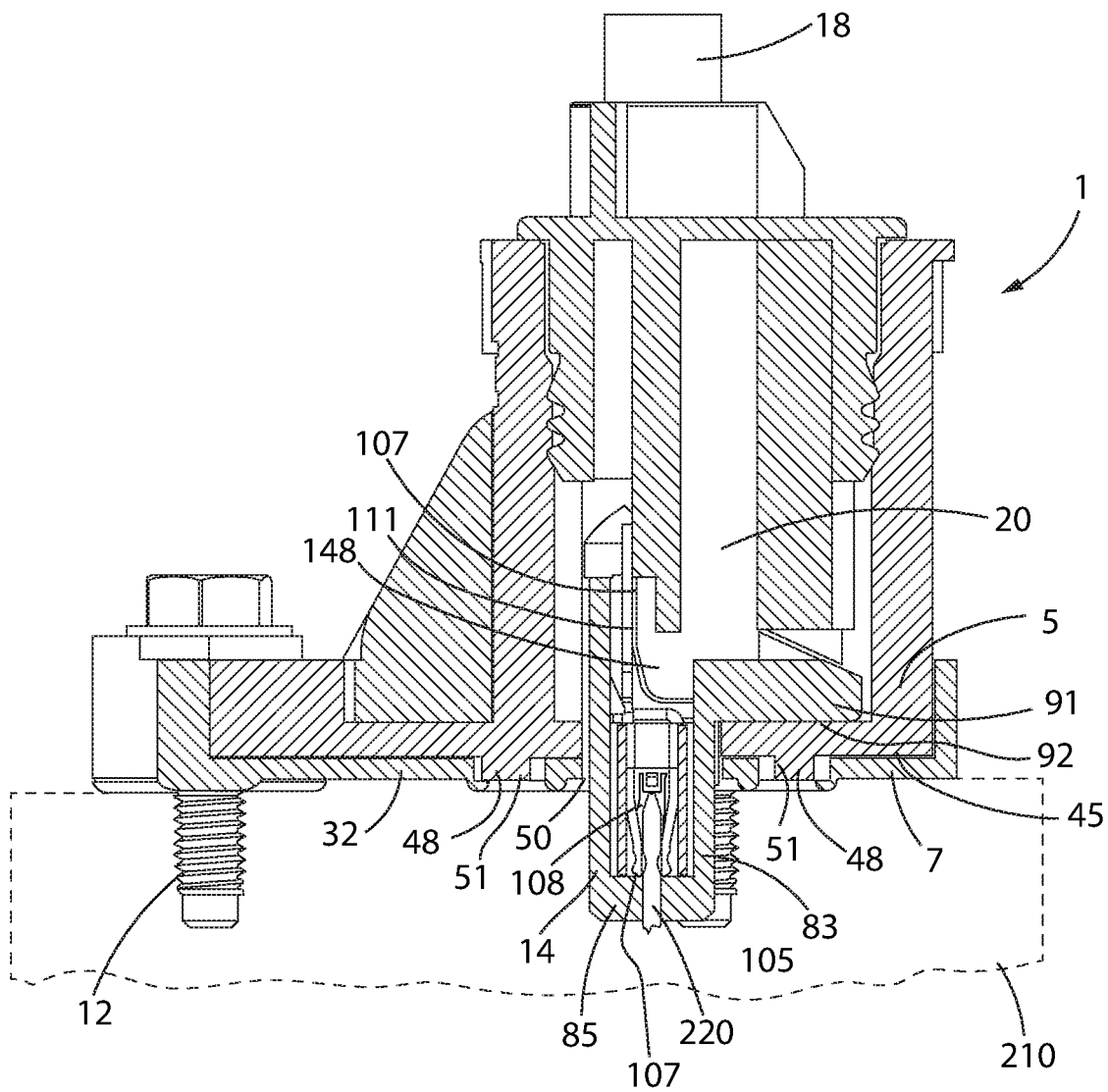
FIG. 16 is the fully assembled vertical high voltage connector of this invention showing the wedge (or impinging) mechanism for securing the cables in the inner housing contained within the outer housing, and further showing a terminal extending from a corresponding device, onto which the connector is mounted, to connect with an end terminal of the cable reinforcement retainer assembly.

Also illustrated in FIG. 15 is the wedge or impinging mechanism A for securing the cables 18 in the inner housing 14. More particularly, when the back cover 20 is slid down, along the cables 18, through the central opening 40 and into the outer housing 5, the front portions 149 of the substantially half-circular tubular members 148 (see, FIG. 12A) of the back cover 20 respectively wedge or impinge against the side face portions 111 (see, FIG. 11B) of the end portions 110 of the end terminals 107 of the cable reinforcement retainer assemblies 108, thereby securing the cables 18 inside the inner housing 14. As shown in FIG. 16, the ends of the flexible members 119, 121 of the terminal 107 (see, e.g., FIG. 10), which extend to the outside of the clamp 105, connect with a set of terminals 220 of the associated device 210.

Thereafter, to shield the exposed cables 18, the braided shield 22 is lowered towards the outer housing assembly 3 whereby a lower portion of the braided shield 22 passes the outer ledges 98a, 98b (see, FIG. 6) extending from an upper portion of the outer housing 3. The clamp 25 is then slid along the braided shield 22 pass the outer ledges 98a, 98b, and at about beneath the outer ledges 98a, 98b, the clamp 25 connects the braided shield 22 to the outer housing 5 and assures the connection thereof.

When fully-assembled, the vertical high voltage connector 1 of this invention includes a ground system that is provided with the connection of the connector 1 to the associated aluminum device 210 by establishing contacts among the metal-infused conductive plastic outer housing 5, the aluminum compression limiters 28, the stainless steel bolts 12, and the associated aluminum device 210. The substantial reduction or substantial elimination of EMI is provided by the shielding of the EMI by the braided shield 22 extending along the paths of the cables 18, or the diversion of the EMI from the braided shield 22 to the metal-infused pads 48, which are used for EMI grounding, contacting the associated aluminum device 210. That is, the EMI is diverted to a path from the stainless steel braided shield 22, which is connected to the metal-infused plastic outer housing 5 by the stainless steel clamp 25, to the metal-infused plastic outer housing 5 mounted onto the, for example, aluminum automotive transmission 210. This invention further provides a galvanic corrosion prevention with the base 52 of the non-conducting over-molded silicone seal 7 shielding the metal-infused conductive plastic outer housing 5 and the associated aluminum device 210 from electrolytic fluid to prevent galvanic corrosion. Galvanic corrosion is further prevented with the side members 57 of the upper portion 55 of the silicone seal 7 shielding the metal-infused conductive plastic outer housing 5 and the aluminum compression limiters 28, and further shielding the stainless bolts 12 and the associated aluminum device 210 from electrolytic fluid to prevent galvanic corrosion.

The present invention is not limited to the above-described embodiments; and various modifications in design, structural arrangement or the like may be used without departing from the scope or equivalents of the present invention.

I claim:

1. A high voltage connector, comprising:
   an outer housing assembly mounted onto a device;
   an inner housing mounted inside said outer housing;
   a set of cable reinforcement retainer assemblies secured, in its entirety, inside said inner housing, said set of cable reinforcement retainer assemblies having respective cable terminals and cables attached thereto;
   a back cover, through which said cables respectively slide along, and covers a central opening of said outer housing, wherein said back cover contacts said outer housing assembly and is locked onto said outer housing assembly, and wherein said outer housing assembly locks said back cover;
   a braided shield covering said cables and being mounted onto said outer housing; and
   a clamp, mounted onto a lower portion of said braided shield, for connecting said lower portion of said braided shield onto said outer housing.

2. The high voltage connector according to claim 1, wherein said outer housing assembly includes an overmolded silicone seal onto which a base of said outer housing is mounted.

3. The high voltage connector according to claim 1, wherein said inner housing includes slots through which said set of cable reinforcement retainer assemblies are accommodated.

4. The high voltage connector according to claim 3, wherein said inner Housing is in a substantially inverted L-shaped when secured inside said outer housing, wherein said substantially L-shaped inner housing comprises a downwardly extending member and a back extending member thereof.

5. The high voltage connector according to claim 1, wherein each of said cable reinforcement retainer assemblies includes a clamp or retainer being mounted onto and surrounding an end terminal, said end terminal being attached to a cable terminal.

6. The high voltage connector according to claim 1, wherein said back cover includes apertures for accommodating therein said cables attached to said cable reinforcement retainer assemblies.

7. The high voltage connector according to claim 6, wherein said back cover includes an upper portion and a bottom portion, said upper portion having tubular members extending therefrom and said lower portion having substantially half-circular tubular members extending therefrom, and wherein apertures of said tubular members and said substantially half-circular tubular members communicate with said apertures of said back cover for respectively accommodating therein said cables.

8. The high voltage connector according to claim 7, wherein said back cover is a terminal position assurance (TPA) device for assuring that said cable terminals and said cables are securely inside said inner and outer housings.

9. The high voltage connector according to claim 7, wherein end portions of said substantially half circular tubular members of said back cover respectively wedge or impinge against end terminals of said cable reinforcement retainer assemblies when said cable reinforcement retainer assemblies, along with said respective cables attached thereto, are secured inside said inner housing.

10. The high voltage connector according to claim 1, wherein said outer housing is mounted onto a device with steel bolts and aluminum compression limiters respectively passing through side portions extending from a base thereof.

11. The high voltage connector according to claim 10, wherein said outer housing is made of metal-infused plastic.

12. The high voltage connector according to claim 10, wherein said outer housing is made of nylon with stainless steel fibers.

13. The high voltage connector according to claim 10, wherein said inner housing is made of nylon.

14. The high voltage connector according to claim 10, wherein said device is made of aluminum.

15. The high voltage connector according to claim 14, wherein each of said braided shield and said clamp is made of stainless steel.

16. A method for assembling a high voltage connector, comprising the steps of:
   mounting outer housing onto a device;
   inserting an inner housing inside said outer housing;
   inserting a set of cable reinforcement retainer assemblies into said inner housing and securing, in its entirety, said set of cable reinforcement retainer assemblies inside said inner housing, said cable reinforcement retainer assemblies having respective cables attached thereto;
   sliding a back cover along said cables, said back cover entering said outer housing and covering a central opening of said outer housing, and said back cover contacting said outer housing and being locked onto said outer housing, wherein said step of said back cover entering said outer housing and covering said central opening of said outer housing includes a step of said outer housing locking said back cover;
   providing a braided shield to cover said cables, said braided shield being mounted onto said outer housing; and
   ensuring the mounting of said braided shield onto said outer housing with a clamp, a connection of said braided shield and said outer housing being assured by said clamp.

17. The method for assembling a high voltage connector according to claim 16, wherein said step of inserting said inner housing inside said outer housing includes a step of securing said inner housing inside said outer housing with flexible latch members on opposing sides of said inner housing respectively entering indentations on opposing inner sides of said outer housing, and producing a first substantially clicking sound.

18. The method for assembling a high voltage connector according to claim 17, wherein said step of inserting said set of cable reinforcement retainer assemblies includes a step of securing said cable reinforcement retainer assemblies inside the inner housing with a clamp of at least one of said cable reinforcement retainer assemblies settling beneath a respective one of an inclined ledge of said inner housing, and producing a second substantially clicking sound.

19. The method for assembling a high voltage connector according to claim 18, wherein said step of sliding said back cover along said cables, and entering and covering said central opening of said outer housing includes a step of inclined protruding members at opposing sides of said back cover respectively entering apertures passing through side portions of said outer housing, and producing a third substantially clicking sound.

20. The method for assembling a high voltage connector according to claim 16, wherein said step of sliding said back cover along said cables, and entering and covering said central opening of said outer housing includes a step of wedging or impinging portions of at least a substantially half-circular tubular member, extending from a lower portion of said back cover, against side face portions of at least an end portion of an end terminal of at least a respective one of a set of cable reinforcement retainer assemblies, and thereby securing said cable terminals and said cables inside said inner housing secured inside said outer housing.

* * * * *